United States Patent
Brickell et al.

(10) Patent No.: US 12,373,821 B2
(45) Date of Patent: Jul. 29, 2025

(54) CONFIRMING PHYSICAL POSSESSION OF PLASTIC NFC CARDS WITH A MOBILE DIGITAL WALLET APPLICATION

(71) Applicant: Google LLC, Mountain View, CA (US)

(72) Inventors: Justin Lee Brickell, San Francisco, CA (US); Max Christoff, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 80 days.

(21) Appl. No.: 18/163,596

(22) Filed: Feb. 2, 2023

(65) Prior Publication Data
US 2023/0289777 A1    Sep. 14, 2023

Related U.S. Application Data

(63) Continuation of application No. 14/527,763, filed on Oct. 29, 2014, now abandoned.

(51) Int. Cl.
*G06Q 20/36* (2012.01)
*G06F 21/34* (2013.01)
(Continued)

(52) U.S. Cl.
CPC ........... *G06Q 20/367* (2013.01); *G06F 21/34* (2013.01); *G06Q 20/382* (2013.01); *G06Q 20/401* (2013.01); *H04L 63/08* (2013.01)

(58) Field of Classification Search
CPC .. G06Q 20/367; G06Q 20/382; G06Q 20/401; G06F 21/34; H04L 63/08
(Continued)

(56) References Cited

U.S. PATENT DOCUMENTS 6,300,873 B1   10/2001   Kucharczyk et al.
6,633,981 B1 *   10/2003   Davis .................. G06F 21/57
                                                   713/185
(Continued)

OTHER PUBLICATIONS

Youtube, "Fast Touch—Mobile Wallet (adding credit cards via NFC)", Oct. 31, 2013, https://www.youtube.com/watch?v=pXsLGZIEGGU, 2 pages (Year: 2013).*
(Continued)

*Primary Examiner* — James D Nigh
(74) *Attorney, Agent, or Firm* — DORITY & MANNING, P.A.

(57) ABSTRACT

In an example embodiment, an issuer system receives payment card information from a payment processing system, wherein the payment card information is received from a payment card via a user computing device using near field communication. The issuer system generates an unpredictable number for the payment card and communicates the unpredictable number to the payment card via the payment processing system and the user computing device. The payment card calculates a cryptographic checksum based on the unpredictable number and a shared secret and communicates the checksum to the issuer system via the user computing device and payment processing system. The issuer system verifies the checksum using the shared secret and the unpredictable number. The issuer system generates a token associated with the payment card and transmits the token to the user computing device via the payment processing system for use in an online transaction.

17 Claims, 11 Drawing Sheets

(51) Int. Cl.
  *G06Q 20/38* (2012.01)
  *G06Q 20/40* (2012.01)
  *H04L 9/40* (2022.01)

(58) Field of Classification Search
  USPC ........................................................ 705/67
  See application file for complete search history.

(56) References Cited

U.S. PATENT DOCUMENTS

| | | | |
|---|---|---|---|
| 2003/0130955 | A1 | 7/2003 | Hawthorne |
| 2009/0164322 | A1 | 6/2009 | Khan et al. |
| 2010/0274722 | A1* | 10/2010 | Roberts ................ G07F 7/1008 705/44 |
| 2011/0302646 | A1* | 12/2011 | Ronda ................ H04L 9/3268 726/9 |
| 2013/0024364 | A1 | 1/2013 | Shrivastava et al. |
| 2013/0036048 | A1 | 2/2013 | Campos et al. |
| 2013/0200999 | A1 | 8/2013 | Spodak et al. |
| 2014/0020068 | A1 | 1/2014 | Desai et al. |
| 2014/0040139 | A1 | 2/2014 | Brudnicki et al. |
| 2014/0081860 | A1 | 3/2014 | Adrangi et al. |
| 2014/0195425 | A1* | 7/2014 | Campos ............ G06Q 20/4018 705/41 |
| 2014/0337175 | A1* | 11/2014 | Katzin ................ G06Q 20/326 705/26.62 |
| 2014/0337236 | A1* | 11/2014 | Wong ................ G06Q 20/3278 705/41 |
| 2014/0379361 | A1 | 12/2014 | Mabadkar et al. |
| 2015/0032627 | A1 | 1/2015 | Dill et al. |
| 2015/0038118 | A1 | 2/2015 | Bertreau et al. |
| 2015/0356551 | A1 | 12/2015 | Dogin et al. |
| 2015/0363771 | A1 | 12/2015 | Graylin et al. |
| 2015/0371234 | A1 | 12/2015 | Huang et al. |
| 2016/0005032 | A1 | 1/2016 | Yau et al. |

OTHER PUBLICATIONS

Youtube, "Fast Touch—Mobile Wallet (adding credit cards via NFC)", Oct. 31, 2013, https://www.youtube.com/watch?v=pXsLGZIEGGU, 2 pages.

* cited by examiner ional NFC CARDS WITH A MOBILE
CONFIRMING PHYSICAL POSSESSION OF PLASTIC NFC CARDS WITH A MOBILE DIGITAL WALLET APPLICATION

PRIORITY CLAIM

The present application is a continuation of U.S. application Ser. No. 14/527,763 having a filing date of Oct. 29, 2014. Applicant claims priority to and the benefit of each of such applications and incorporate all such applications herein by reference in its entirety.

TECHNICAL FIELD

The present disclosure relates to improving the security of transactions in which tokenized payment card information is provisioned on a user computing device.

BACKGROUND

Payment card "tokenization" is a process by which a digital wallet service provides a tokenized version of a payment card to store in a user computing device for use in transactions initiated by the user computing device with a near-field communication ("NFC") enabled merchant point of sale device. Payment card issuers may desire to verify that a payment card device is in the physical possession of the account holder at the time the payment card data is received by the user computing device for tokenization. Some verification procedures require that a user log in to a web site of the payment card issuer and enter a code that the user received with the payment card. However, such a process may be cumbersome and deter users from initiating or completing the tokenization of the payment card information with the digital wallet service.

SUMMARY

Techniques herein provide computer-implemented methods to add a tokenized payment card to a user computing device for use in a transaction with a merchant system. In an example embodiment, a user computing device receives payment card information from a payment card device via a wireless near field communication ("NFC") channel and communicates the payment card information to the issuer system via a payment processing system. The issuer system generates an unpredictable number for the payment card and communicates the unpredictable number to the payment card via the payment processing system and the user computing device. An application resident on the payment card calculates a cryptographic checksum based on the unpredictable number and the shared secret and communicates the checksum and payment card information to the user computing device, which communicates the checksum, payment card information, and a user computing device identifier to the issuer system via the payment processing system. The issuer system verifies the checksum using the shared secret and the unpredictable number associated with the payment card information. The issuer system generates a token associated with the payment card and transmits the token to the user computing device via the payment processing system for storage on the digital wallet application resident on the user computing device. The user conducts a transaction with a point of sale ("POS") device at a merchant system location via the digital wallet application resident on the user computing device using the token associated with the payment card. The user computing device transmits the token along with a payment authorization request and the user computing device identifier to the issuer system, which approves the transaction if the token is valid and if the user computing device identifier is associated with the payment card.

In certain other example aspects described herein, systems and a computer program products to add a tokenized payment card to a user computing device for use in a transaction with a merchant system are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
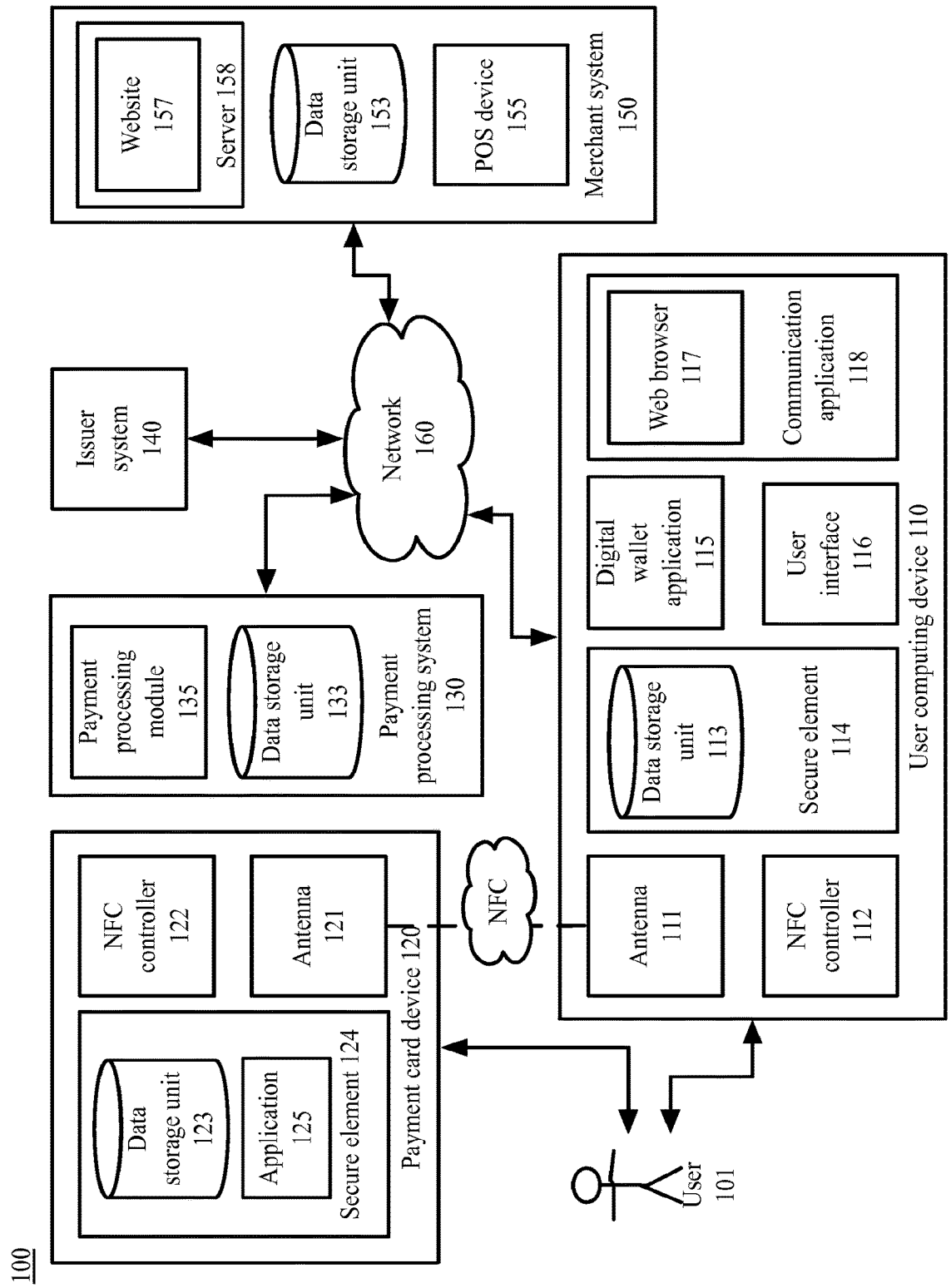
FIG. 1 is a block diagram depicting a system for adding a tokenized payment card to a user computing device for use in a transaction with a merchant system, in accordance with certain example embodiments.

The example embodiments described herein provide computer-implemented techniques for adding a tokenized payment card to a user computing device for use in a transaction with a merchant system.

In an example embodiment, an issuer system manufactures, or causes to be manufactured, a payment card comprising a shared secret stored in the payment card for distribution to a user. The user selects an option to add the payment card to a digital wallet application resident on a user computing device that communicates with a payment processing system. The user computing device establishes a near field communication ("NFC") channel with the payment card, receives payment card information from the payment card, communicates the payment card information to the issuer system to the issuer system via the payment processing system. The issuer system generates an unpredictable number for the payment card and communicates the unpredictable number to the payment card via the payment processing system and the user computing device. An application resident on the payment card calculates a cryptographic checksum based on the unpredictable number and the shared secret and communicates the checksum and payment card information to the user computing device, which communicates the checksum, payment card information, and a user computing device identifier to the issuer system via the payment processing system. The issuer system verifies the checksum using the shared secret and the unpredictable number associated with the payment card information. The issuer system generates a token associated with the payment card and transmits the token to the user computing device via the payment processing system for storage on the digital wallet application resident on the user computing device. The user conducts a transaction with a point of sale ("POS") device at a merchant system location or with an online merchant website via the digital wallet application resident on the user computing device using the token associated with the payment card. The user computing device transmits the token along with a payment authorization request and the user computing device identifier to the issuer system, which approves the transaction if the token is valid and if the user computing device identifier is associated with the payment card.

In an example embodiment, the issuer system receives a request to generate a payment card for a user. In an example, the user applies for a credit card with the issuer system or an acquirer system associated with the issuer system. The issuer system generates financial account information and a payment card is manufactured. For example, the issuer system creates a user account associated with the user applying for the payment card and creates an account number associated with the user account. In another example embodiment, the payment processing system retrieves financial account information associated with the user and manufactures a payment card for the user. For example, the user lost a payment card and requests a replacement payment card from the issuer system.

In the example embodiments described herein, the issuer system generates a shared secret and stores the shared secret on the payment card device or otherwise arranges for the shared secret to be stored on the payment card device. An example payment card device comprises a plastic payment card comprising an application capable of communicating with a user computing device via a wireless communication channel, for example, a near field communication ("NFC") channel, a Bluetooth communication channel, or a Wi-Fi communication channel. In an example embodiment, the example payment card device comprises a secure memory or a secure element that stores the payment card information associated with the user account. The user receives the payment card device. For example, the issuer system mails the payment card device to an address provided by the user in the user's application for a payment card.

In an example embodiment, the user establishes a digital wallet account with a payment processing system. For example, the user accesses a website, via a user computing device, associated with the payment processing system and establishes the digital wallet account. The user downloads a digital wallet application onto the user computing device. In the example embodiments described herein, the digital wallet application resident on the user computing device communicates with the payment processing system via a network. The user may use the digital wallet account and/or digital wallet application resident on the user computing device to store payment information associated with one or more payment card devices.

In an example embodiment, the user selects the digital wallet application on the user computing device and selects an option to add a payment card to the digital wallet account. The digital wallet application displays an instruction to the user to tap the payment card device to the user computing device. In an example embodiment, the user taps the payment card device to the user computing device and a near field communication ("NFC") channel is established between the payment card device and the user computing device. For example, a controller resident on the user computing device may instruct an antenna resident on the user computing device to output a radio signal or listen for radio signals. In this example, a controller on the payment card device may instruct an antenna resident on the payment card device to output radio signals or listen for radio signals. Either the user computing device or the payment card device detects the proximity of the other device and the two devices establish an NFC communication channel over which data may be communicated between the two devices. In another example embodiment, another type of communication channel is established, such as a Bluetooth communication channel or a Wi-Fi communication channel.

In an example embodiment, the payment card application transmits payment card information to the user computing device via the communication channel. The payment processing system transmits a request to the issuer system for an unpredictable number along with the payment card information and a user computing device identifier. An example user computing device identifier is an identifier specific to the user computing device, such as a MAC ID. The issuer system generates an unpredictable number for the payment card device and transmits the unpredictable number to the payment processing system, which transmits the unpredictable number to the user computing device. In an example embodiment, the digital wallet application resident on the user computing device transmits the unpredictable number to the payment card device via the wireless communication channel maintained between the user computing device and the payment card device.

In an example embodiment, the payment card device receives the unpredictable number and calculates a cryptographic checksum based on the unpredictable number and the shared secret. In an example, the payment card device application retrieves the shared secret from a secure memory or secure element resident on the payment card device. The payment card device transmits the cryptographic checksum to the user computing device via the wireless communication channel. The payment processing system receives the cryptographic checksum from the user computing device and transmits the checksum to the issuer system along with the user computing device identifier and the payment card information.

In an example embodiment, the issuer system receives the checksum, the payment card information, and the user computing device identifier. The issuer system calculates the cryptographic checksum associated with the payment card information using the shared secret and unpredictable number. For example, the issuer system may comprise a database wherein payment card information associated with a payment card device are stored and associated with corresponding shared secrets, generated unpredictable numbers, and user computing device identifiers. In this example, when the issuer system receives the payment card information from the user computing device, the issuer system retrieves the corresponding unpredictable number previously generated for the payment card device and the corresponding shared secret. In an example embodiment, the issuer system compares the calculated cryptographic checksum to the cryptographic checksum received from the user computing device.

In an example embodiment, the issuer system generates a token and associates the token with the payment card information and the user computing device identifier. For example, the issuer system generates the token in response to finding a match between the checksum calculated by the issuer system and the checksum received from the user computing device. In an example, the token comprises a virtual credit number that can be used in place of the actual credit number associated with the payment card device in a transaction with a point of sale ("POS") device at a merchant system location. The issuer system transmits the token to the payment processing system, which associates the token with the payment card device and stores the token. In an example embodiment, the token is also stored in the digital wallet application resident on the user computing device.

In an example embodiment, the user conducts an online transaction with a merchant system using the token associated with the payment card device. For example, the user accesses a merchant system website using the user computing device, selects one or more items for purchase, and selects an option to check out using the user's digital wallet account. In other example embodiments, the user conducts a transaction with the merchant system via a point of sale ("POS") device at a merchant system location. For example, the user taps the user computing device to the merchant system POS device 155 to initiate a transaction. In an example embodiment, in response to the user initiating an online transaction or a transaction with a POS device, the digital wallet application displays a request for the user to select payment card information, and the user selects the payment card information associated with the payment card device and initiates a transaction. The user computing device communicates the selection of the payment card information and a user computing device identifier to the POS device or to the merchant system website. The POS device or the merchant system website transmits the selection of the payment card information and the user computing device identifier to the payment processing system. The payment processing system transmits a transaction authorization request, the user computing device identifier, and the token to the issuer system. The issuer system verifies the token and transmits a response to the payment processing system. In an example, if the token is valid and the user device identifier is associated with the payment information corresponding to the token, the issuer system approves the payment authorization request and transmits a notice of approval of the payment request to the user computing device. In this example, the payment processing system completes the transaction and sends a receipt to the user computing device. In another example, if the token is not valid or if the user device identifier is not associated with the payment information corresponding to the token, the issuer system denies the payment authorization request and transmits a notice of denial of the payment request to the user computing device. In this example, the payment processing system transmits an error message to the user computing device for display on the user computing device, notifying the user that the transaction was not successful.

By using and relying on the methods and systems described herein, the issuer system, payment processing system, and user computing device enable the user to tokenize payment card information associated with an NFC-enabled payment card device so that the user may use the payment card information in a transaction without having to produce the physical payment card device at the time of payment. Additionally, by issuing the payment card device comprising the shared secret to the user and conducting a verification of the checksum via the payment processing system communicating with the user computing device, the issuer system is able to verify user possession of the payment card device without the user having to undergo separate communication with the issuer system, as required in some current technology. For example, the methods and systems described herein do not require the user to access a web site of the issuer system and enter a password or otherwise communicate a verification value communicated out of band to the user from the issuer system. As such, the systems and methods described herein may reduce the inputs required by the user via the user computing device and the processing required by the issuer system to verify user possession of the payment card device. Additionally, by verifying user possession of the payment card device when provisioning the payment token on the user computing device, subsequent transactions using the token on the user computing device may receive "card present" transaction rates, which are less than "card not present" transaction rates.

Example System Architecture

Turning now to the drawings, in which like numerals indicate like (but not necessarily identical) elements throughout the figures, example embodiments are described in detail.

FIG. 1 is a block diagram depicting a system 100 for adding a tokenized payment card to a user computing device for use in a transaction with a merchant system, in accordance with certain example embodiments. As depicted in FIG. 1, the system 100 includes network computing devices 110, 120, 130, 140, and 150 that are configured to communicate with one another via one or more networks 160. In some embodiments, a user associated with a device must install an application and/or make a feature selection to obtain the benefits of the techniques described herein.

In example embodiments, the network 160 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, NFC, or any combination thereof or any other appropriate architecture or system that facilitates the communication of signals, data, and/or messages, and allows for the measurement of a received signal strength indicator ("RSSI") or other similar measurement such as the free space path loss, the received channel power indicator ("RCPI"), the time of arrival ("TOA"), and/or the round trip time ("RTT"). Throughout the discussion of example embodiments, it should be understood that the terms "data" and "information" are used interchangeably herein to refer to text, images, audio, video, or any other form of information that can exist in a computer-based environment.

Each network computing device 110, 120, 130, 140, and 150 includes a device having a communication module capable of transmitting and receiving data over the network 160. For example, each network computing device 110, 120, 130, 140, and 150 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, 140, and 150 are operated by users 101, users 101, payment processing system operators, issuer system operators, and merchant system operators, respectively.

An example user computing device 110 comprises an antenna 111, an NFC controller 112, a data storage unit 113, a secure element 114, a digital wallet application 115, a user interface 116, a web browser 117, and a communication application 118.

In an example embodiment, the antenna 111 is a means of communication between the user computing device 110 and a payment card device 120. In an example embodiment, an NFC controller 112 outputs through the antenna 111 a radio signal, or listens for radio signals from the payment card device 120. In another example embodiment a Bluetooth controller or a Wi-Fi controller is used. In certain example embodiments, the user 101 initiates a digital wallet transaction with a merchant system 150 point of sale ("POS") device 155 at a merchant system 150 location. In these example embodiments, the NFC controller 112 outputs through the antenna 111 a radio signal, or listens for radio signals from the merchant system 150 POS device 155.

In an example embodiment, the NFC controller 112 is capable of sending and receiving data, performing authentication and ciphering functions, and directing how the user computing device 110 will listen for transmissions from the payment card device 120 or configuring the user computing device 110 into various power-save modes according to NFC-specified procedures. In another example embodiment, the user computing device 110 comprises a Bluetooth controller or a Wi-Fi controller capable of performing similar functions. An example NFC controller 112 communicates with the digital wallet application 115 and is capable of sending and receiving data over a wireless, NFC communication channel. In another example embodiment, a Bluetooth controller 112 or Wi-Fi controller 112 performs similar functions as the NFC controller 112 using Bluetooth or Wi-Fi protocols.

In an example embodiment, the NFC controller 112 activates the antenna 111 to create the wireless communication channel. The user computing device 110 communicates with the payment card device 120 via the antenna 111. In an example embodiment, when the user computing device 110 has been activated, the NFC controller 112 polls through the antenna 111 a radio signal, or listens for radio signals from the payment card device 120. In certain example embodiments, the user 101 initiates a digital wallet transaction with a merchant system 150 point of sale ("POS") device 155 at a merchant system 150 location. In these example embodiments, the NFC controller 112 polls through the antenna 111 a radio signal, or listens for radio signals from the merchant system 150 POS device 155.

In an example embodiment, the data storage unit 113 comprises a local or remote data storage structure accessible to the user computing device 110 suitable for storing information. In an example embodiment, the data storage unit 113 stores encrypted information, such as HTML5 local storage. In an example embodiment, the data storage unit 113 resides within a secure element 114. In an example embodiment, the user computing device 110, digital wallet application 115, and/or web browser 117 application associated with the payment processing system 130 stores a token generated by the issuer system 140 on the user computing device 110.

In an example embodiment, the secure element 114 exists within a removable smart chip or secure digital (SD) card or may be embedded within a fixed chip on the user computing device 110. In certain example embodiments, Subscriber Identity Module (SIM) cards may be capable of hosting a secure element 114, for example, an NFC SIM Card. The secure element 114 allows a digital wallet application 115 or other application resident on the user computing device 110 to interact securely with certain functions within the secure element 114, while protecting information stored within the secured element 114. In an example embodiment, the secure element 114 comprises components typical of a smart card, such as crypto processors and random generators. In an example embodiment, the secure element 114 comprises a Smart MX type NFC controller in a highly secure system on a chip controlled by a smart card operating system, such as a JavaCard Open Platform (JCOP) operating system. In another example embodiment, the secure element 114 is configured to include a non-EMV type contactless smart card, as an optional implementation. The secure element 114 communicates with the digital wallet application 115 in the user device 110. In an example embodiment, the secure element 114 is capable of storing encrypted user information and only allowing trusted applications to access the stored information. In an example embodiment, an NFC controller 112 interacts with a secure key encrypted application for decryption and installation in the secure element 114.

In an example embodiment, the digital wallet application 115 is a program, function, routine, applet, or similar entity that exists on and performs its operations on the user computing device 110. In certain embodiments, the user 101 must install the digital wallet application 115 and/or make a feature selection on the user computing device 110 to obtain the benefits of the techniques described herein. In an example embodiment, the digital wallet application 115 communicates with the payment processing system 130, which manages the user's 101 digital wallet account. In an example embodiment, the user 101 may access the user's 101 digital wallet account via the digital wallet application 115. In an example embodiment, the user 101 may select an option, via the digital wallet application 115, to add payment card information to the digital wallet account. In an example embodiment, in response to receiving the user 101 selection of an option to add a payment card to the digital wallet account, the digital wallet application 115 displays, on the user computing device user interface 116, a request for the user 101 to tap a payment card device 120 to the user computing device 110. In an example embodiment, the digital wallet application 115 establishes a wireless communication channel with the payment card device 120 in response to detecting that the user 101 has tapped the payment card device 120 to the user computing device 110. In certain example embodiments, the user 101 initiates a digital wallet transaction with a merchant system 150 point of sale ("POS") device 155 at a merchant system 150 location. In these example embodiments, in response to detecting that the user 101 has tapped the user computing device 110 to the merchant system 150 POS device 155, the digital wallet application 115 establishes a wireless communication channel with the merchant system 150 POS device 155.

In an example embodiment, when the user 101 initiates a digital wallet transaction with the merchant system 150 on the merchant system website 157, the digital wallet application 115 displays a request for the user 101 to select payment information from the user's 101 digital wallet account to use in the transaction. In another example embodiment, when the user 101 initiates a digital wallet transaction with the merchant system 150 via a merchant system 150 point of sale ("POS") device 155 at a merchant system 150 location, the digital wallet application 115 displays a request for the user 101 to select information from the user's 101 digital wallet account to use in the transaction. In an example embodiment, in response to receiving a user 101 selection of the payment card device 120 for use in the transaction, the digital wallet application 115 communicates the user 101 selection of the payment card device 120 to the payment processing system 130.

In certain example embodiments described herein, one or more functions performed by the digital wallet application 115 resident on the user computing device 110 may also be performed by a web browser 117 application associated with the payment processing system 130 or by the payment processing system 130. In certain example embodiments described herein, one or more functions performed by the payment processing system 130 may also be performed by the digital wallet application 115. In certain example embodiments described herein, one or more functions performed by the web browser 117 application associated with the payment processing system 130 may al so be performed by the digital wallet application 115.

In certain example embodiments described herein, the digital wallet application 115 maintains periodic or constant communication with the payment processing system 130 via the network 160. In certain example embodiments, the digital wallet application 115 and is able to send and receive data associated with the user's 101 digital wallet account to and from the payment processing system 130 when appropriate. For example, the digital wallet application 115 may communicate user 101 interactions with the digital wallet application 115 via the user interface 116 to the payment processing system 130, such as a user 101 selection of an option to add a payment card device 120 or a user 101 selection of payment card information for use in a transaction with the merchant system 150. In another example, the digital wallet application 115 may receive data associated with the user's 101 digital wallet account from the payment processing system 130, such as a token received by the payment processing system 130 from the issuer system 140 or a approval or denial of a payment authorization request received from the issuer system 140.

In an example embodiment, the user interface 116 may be a touch screen, a voice-based interface or any other interface that allows the user 101 to provide input and receive output from an application or module on the user computing device 110. In an example embodiment, the user interface 116 enables the user 101 to interact with the digital wallet application 115 or a web browser 117 application associated with the payment processing system 130. For example, the user 101 may actuate one or more objects on the user interface 116 to communicate a selection of an option on the digital wallet application 115 to add a payment card device 120 to the user's 101 digital wallet account. In another example, the user 101 may actuate one or more objects on the user interface 116 to communicate a selection of payment card data for use in a transaction to the digital wallet application 115. In example embodiment, the user interface 116 enables the user 101 to interact with a merchant system website 157 via the web browser 117. For example, the user 101 may actuate one or more objects on the user interface 116 to communicate a selection of an option add one or more items to a virtual shopping cart, check out, and/or select an option to conduct a digital wallet transaction on the merchant website 157. In another example embodiment, the user interface 116 enables the user 101 to select an option on the digital wallet application 115 and/or the user computing device 110 to initiate a digital wallet transaction with a merchant system 150 point of sale ("POS") device 155.

In an example embodiment, the user 101 can use a communication application 118, such as a web browser 117 application or a stand-alone application, to view, download, upload, or otherwise access documents or web pages via a distributed network 160.

In an example embodiment, the web browser 117 can enable the user 101 to interact with web pages using the user computing device 110. In an example embodiment, the user 101 may access the user's 101 digital wallet account maintained by the payment processing system 130 via the web browser 117. In another example embodiment, the user 101 may access the merchant system website 157 via the web browser 117. In certain example embodiments described herein, one or more functions performed by the digital wallet application 115 may also be performed by a web browser 117 application associated with the payment processing system 130.

In an example embodiment, the communication application 118 can interact with web servers or other computing devices connected to the network 160, including the user computing device 110 and a web server 158 of a merchant system 150.

An example payment card device 120 comprises an antenna 121, an NFC controller 122, a data storage unit 123, a secure element 124, and an application 125.

In an example embodiment, the issuer system 140 produces the payment card device 120 or otherwise orders the production of the payment card device 120. In an example embodiment, the issuer system 140 generates a shared secret and saves the shared secret on the payment card device 120 or otherwise arranges for the shared secret to be saved on the payment card device 120. In an example embodiment, the payment card device 120 is a standard payment card, such as a credit card or a debit card, which conforms to industry customs and standards. For example, the payment card device 120 may comprise an account number, an expiration date, and other standard information written on the front or back of the card in addition to a magnetic stripe. In the example embodiments described herein, the payment card device 120 is able to establish a wireless communication channel, such as an NFC communication channel, with a user computing device 110 or merchant point of sale ("POS") device 155 and communicate and receive data via the wireless communication channel.

An example NFC controller 122 communicates with the application 125 and is capable of sending and receiving data over a wireless, NFC communication channel. In another example embodiment, the controller 122 is a Bluetooth controller or Wi-Fi controller and is capable of sending and receiving data over the corresponding wireless communication channel. In an example embodiment, the NFC controller 122 activates the antenna 121 to create the wireless communication channel. The payment card device 120 communicates with the user computing device 110 via the antenna 121. In an example embodiment, when the payment card device 120 has been activated, the NFC controller 122 polls through the antenna 121 a radio signal, or listens for radio signals from the user computing device 110.

An example data storage unit 123 comprises a local or remote data storage structure accessible to the payment card device 120 suitable for storing information. In an example embodiment, the data storage unit 123 stores encrypted information, such as HTML5 local storage. In an example embodiment, the data storage unit 123 resides within a secure element 124. In an example embodiment, the data storage unit 123 stores payment card information associated with a user's 101 financial account with the issuer system 140. In an example embodiment, the data storage unit 123 stores a shared secret generated by the issuer system 140.

An example secure element 124 is capable of storing encrypted user information and only allowing trusted applications to access the stored information. In an example embodiment, the shared secret generated by the issuer system 140 and/or the payment card information is stored in the secure element 124.

An example application 125 is a program, function, routine, applet, or similar entity that exists on and performs its operations on the payment card device 120. In certain embodiments, the issuer system 140 must install the application 125 to obtain the benefits of the techniques described herein. In an example embodiment, the application 125 communicates with the NFC controller 122 to activate the antenna 121 and receive data received via the antenna 121 from the user computing device 110. In an example embodiment, the application 125 extracts payment card data stored on the data storage unit 123 and/or secure element 124 in response to receiving a request for payment card information from the user computing device 110 via the wireless NFC communication channel.

An example payment processing system 130 comprises a data storage unit 133 and a payment processing module 135.

An example data storage unit 133 comprises a local or remote data storage structure accessible to the payment processing system 130 suitable for storing information. In an example embodiment, the data storage unit 133 stores encrypted information, such as HTML5 local storage. In an example embodiment, the payment processing system 130 stores data in data storage unit 133 associated with the user's 101 digital wallet account.

An example payment processing module 135 communicates with the user computing device 110 and the issuer system 140. In an example embodiment, the payment processing module 135 transmits a request for an unpredictable number to the issuer system 140, receives an unpredictable number from the issuer system 140, and transmits the unpredictable number to the user computing device 110. In an example embodiment, the payment processing module 135 generates a transaction authorization request associated with a user 101 transaction initiated at the merchant POS device 155 or user 101 initiated online transaction with the merchant system 150. In an example embodiment, the payment processing module 135 transmits the transaction authorization request to the issuer system 140 and receives an approval or denial of the payment authorization request from the issuer system 140. In an example embodiment, the payment processing module 135 generates a receipt based on the received approval or denial of the transaction authorization request. In certain example embodiments, one or more functions performed by the payment processing module 135 and/or payment processing system 130 may also be performed by the digital wallet application 115 and/or a web browser 117 application associated with the payment processing system 130.

An example issuer system 140 maintains a financial account, such as a credit account, associated with the user 101. In an example embodiment, the issuer system 140 produces a payment card device 120 or causes a payment card device 120 to be produced that comprises payment card information associated with the user's 101 financial account. In an example embodiment, the issuer system 140 generates a shared secret that is saved on the payment card device 120. In the example embodiments described herein, the issuer system 140 may communicate with the payment processing system 130, the user computing device 110, and/or the merchant system 150 via the network 160. In an example embodiment, the issuer system 140 generates an unpredictable number in response to receiving a request for an unpredictable number from the payment processing system 130 or the user computing device 110. In an example embodiment, the issuer system 140 verifies a cryptographic checksum calculated by the payment card device 120 using the shared secret associated with the payment card device 120 and the generated unpredictable number.

In an example embodiment, the issuer system 140 generates a token associated with the user's 101 financial account information and transmits the token to the payment processing system 130 or the user computing device 110 for storage in the user's 101 digital wallet account. An example token comprises a virtual credit number that the issuer system 140 associates with the actual financial account number of the user 101. In an example embodiment, the issuer system 140 receives a transaction authorization request, the token, and a user computing device 110 identifier from the payment processing system 130 in association with a user 101 transaction initiated at the merchant POS device 155 or user 101 initiated online transaction with the merchant system 150. In an example embodiment, the issuer system 140 approves the transaction based on the validity of the received token, the validity of the user computing device 110 identifier, and any other relevant considerations for approving a transaction authorization request. In other example embodiments, the issuer system 140 denies a payment authorization request. In an example embodiment, the issuer system 140 transmits a notice of approval or denial of the payment authorization request to the payment processing system 130 and/or the user computing device 110. In an example embodiment, in response to approving the transaction authorization request, schedules a payment to a merchant system 150 account for the amount of the user 101 transaction and bills the user 101 for the transaction amount.

An example merchant system 150 comprises a data storage unit 153, a POS device 155, a website 157, and a server 158.

An example data storage unit 153 comprises a local or remote data storage structure accessible to the merchant system 150 suitable for storing information. In an example embodiment, the data storage unit 153 stores encrypted information, such as HTML5 local storage.

In certain example embodiments, the merchant system 150 comprises a point of sale ("POS") device 155 at a physical location of the merchant system 150 capable of processing a digital wallet transaction with the user computing device 110. In an example embodiment, the POS device 155 is capable of establishing and communicating with the user computing device 110 via a wireless communication channel, for example, a near field communication ("NFC") communication channel. In these example embodiments, the user 101 presents one or more items to purchase to an agent of the merchant system 150 at the POS device 155 initiates a digital wallet transaction by tapping the user computing device 110 to the POS device 155, establishing a wireless NFC communication channel between the two devices. In an example embodiment, the POS device 155 receives a token associated with payment card information and a user computing device 110 identifier from the user computing device 110 via the NFC communication channel. In an example embodiment, the POS device 155 communicates with the payment processing system 130 via the network 160. For example, the POS device 115 communicates the user computing device 110 identifier and token received from the user computing device 110 to the payment processing system 130.

An example website 157 comprises a merchant system 150 shopping website and allows users 101 to select one or more items for purchase on the website 157 and initiate an online digital wallet transaction with the merchant system 150 using a user's 101 digital wallet account associated with the payment processing system 130.

An example server 158 provides the content accessible by the user 101 through the web browser 113 or shopping application (not depicted) on the user computing device 110, including but not limited to html documents, images, style sheets, and scripts. In an example embodiment, the server 158 supports the merchant system's 150 website 157.

It will be appreciated that the network connections shown are example and other means of establishing a communications link between the computers and devices can be used. Moreover, those having ordinary skill in the art having the benefit of the present disclosure will appreciate that the user computing device 110, the payment card device 120, the payment processing system 130, the issuer system 140, and the merchant system 150 illustrated in FIG. 1 can have any of several other suitable computer system configurations. For example, a user computing device 110 embodied as a mobile phone or handheld computer may or may not include all the components described above.

Figure 11:
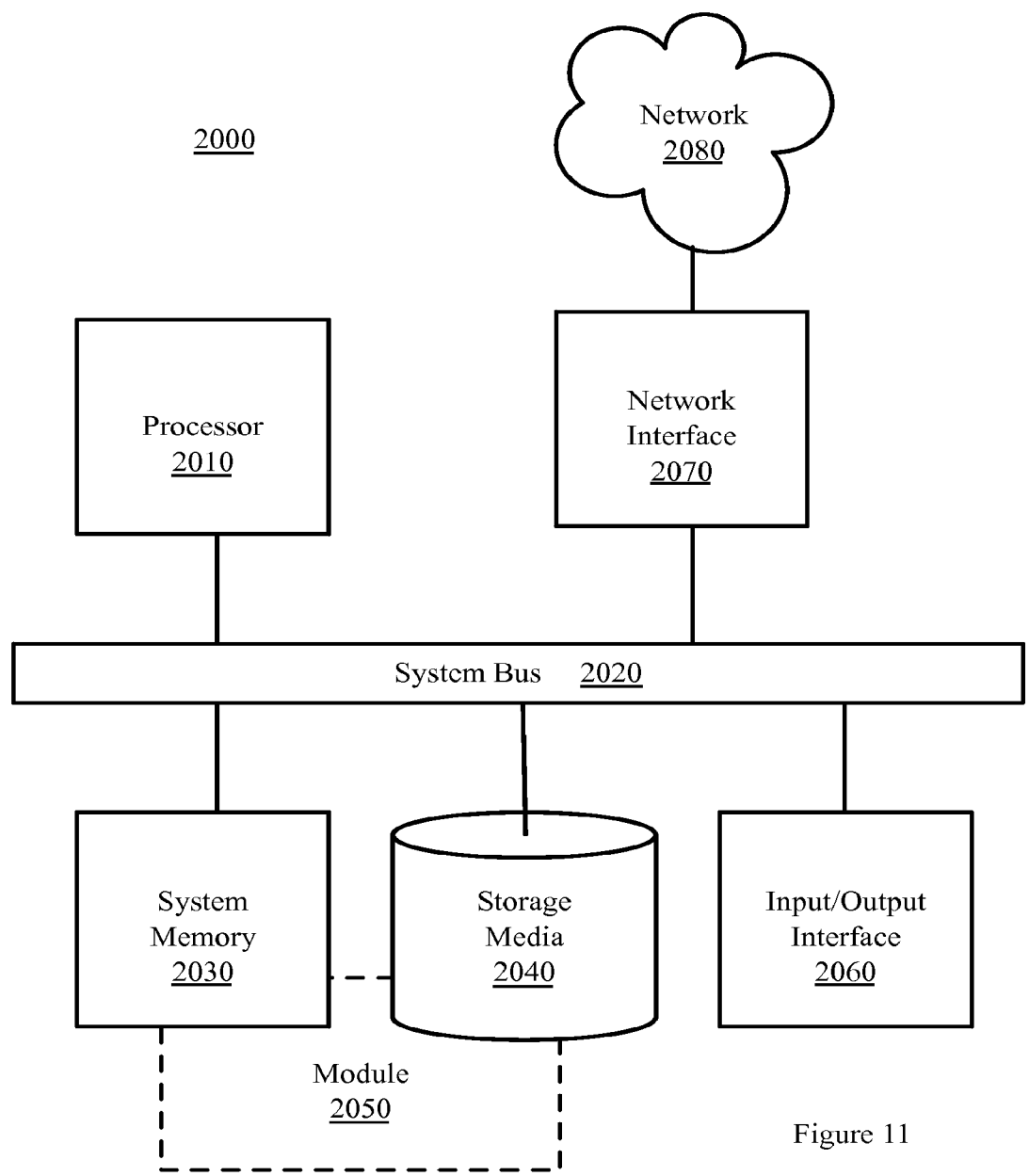
FIG. 11 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 11. Furthermore, any modules associated with any of these computing machines, such as modules described herein or any other modules (scripts, web content, software, firmware, or hardware) associated with the technology presented herein may by any of the modules discussed in more detail with respect to FIG. 11. The computing machines discussed herein may communicate with one another as well as other computer machines or communication systems over one or more networks, such as network 160. The network 160 may include any type of data or communications network, including any of the network technology discussed with respect to FIG. 11.

Example Processes

The example methods illustrated in FIGS. 2-10 are described hereinafter with respect to the components of the example operating environment 100. The example methods of FIGS. 2-10 may also be performed with other systems and in other environments.

Figure 2:
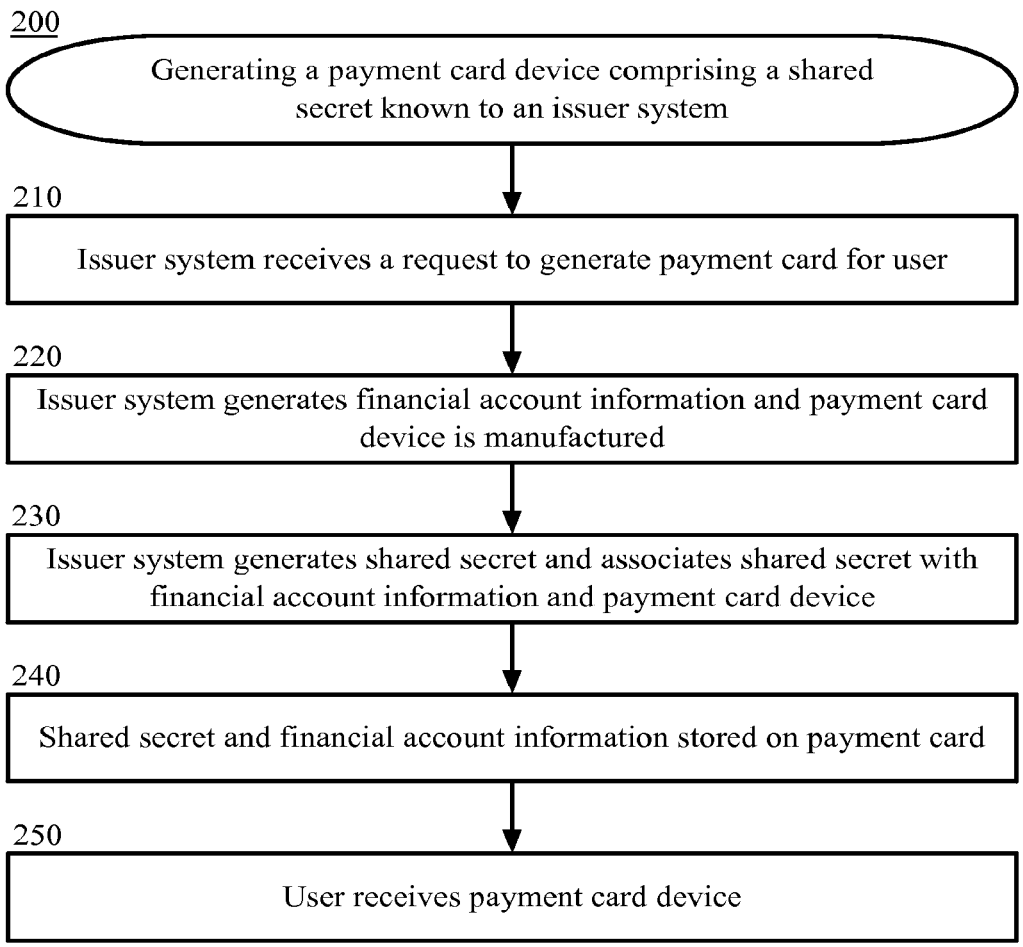
FIG. 2 is a block flow diagram depicting a method for generating a payment card device comprising a shared secret known to an issuer system, in accordance with certain example embodiments.

FIG. 2 is a block diagram depicting a method 200 for generating a payment card device 120 comprising a shared secret known to an issuer system 140, in accordance with certain example embodiments. The method 200 is described with reference to the components illustrated in FIG. 1.

In block 210, the issuer system 140 receives a request to generate a payment card for a user 101. For example, a user 101 applies for a credit card, debit card, or other payment card device 120 with the issuer system 140 or an acquirer system or other system associated with the issuer system 140. For example, the user 101 submits an application for a credit card comprising user 101 demographic data such as the user's 101 name, annual income, annual expenses, estimated amount of debt, address, and any other useful or relevant information related to a credit card application. In another example embodiment, the user 101 already has a financial account associated with the issuer system 140 and the user 101 requests the issuer system 140 to generate a payment card device 120 or replacement payment card device 120 when a user 101 has lost a payment card device 120.

In block 220, the issuer system 140 generates financial account information and a payment card device 120 is manufactured. For example, the issuer system 140 approves the user's 101 application for a payment card device 120 and creates a financial account and payment card device 120 for the user 101. Example financial account information comprises a financial account number. In another example embodiment, the user 101 already has a financial account with the issuer system 140 and the issuer system 140 retrieves the financial account information associated with the user 101. In an example embodiment, the issuer system 140 generates payment card information associated with the manufactured payment card device 120 such as a payment card device 120 number, a card verification value ("CVC"), an expiration date, and/or other necessary information relevant to the user's 101 financial account with the issuer system 140 and/or payment card device 120. In an example embodiment, the issuer system 140 comprises a manufacturing facility and manufactures the payment card device 120. In an example embodiment, the issuer system 140 orders a payment card device 120 to be manufactured by another system.

In block 230, the issuer system 140 generates a shared secret and associates the shared secret with the financial account information and payment card device 130. In an example embodiment, the issuer system 140 comprises a database and stores in the database a record comprising the user's 101 name, financial account number, financial account information, payment card device 120 information, and the shared secret associated with the payment card device 120.

In block 240, the shared secret and financial account information are stored on the payment card device 120. In an example embodiment, the payment card device 120 comprises a secure element 124 or secure memory wherein the financial account information and shared secret are stored. An example shared secret comprises one or more strings of numbers, letters, and/or symbols.

In block 250, the user 101 receives the payment card device 120. In an example embodiment, the user 101 receives the payment card device 120 in the mail along with an approval of the user's 101 application for the payment card device 120.

Figure 3:
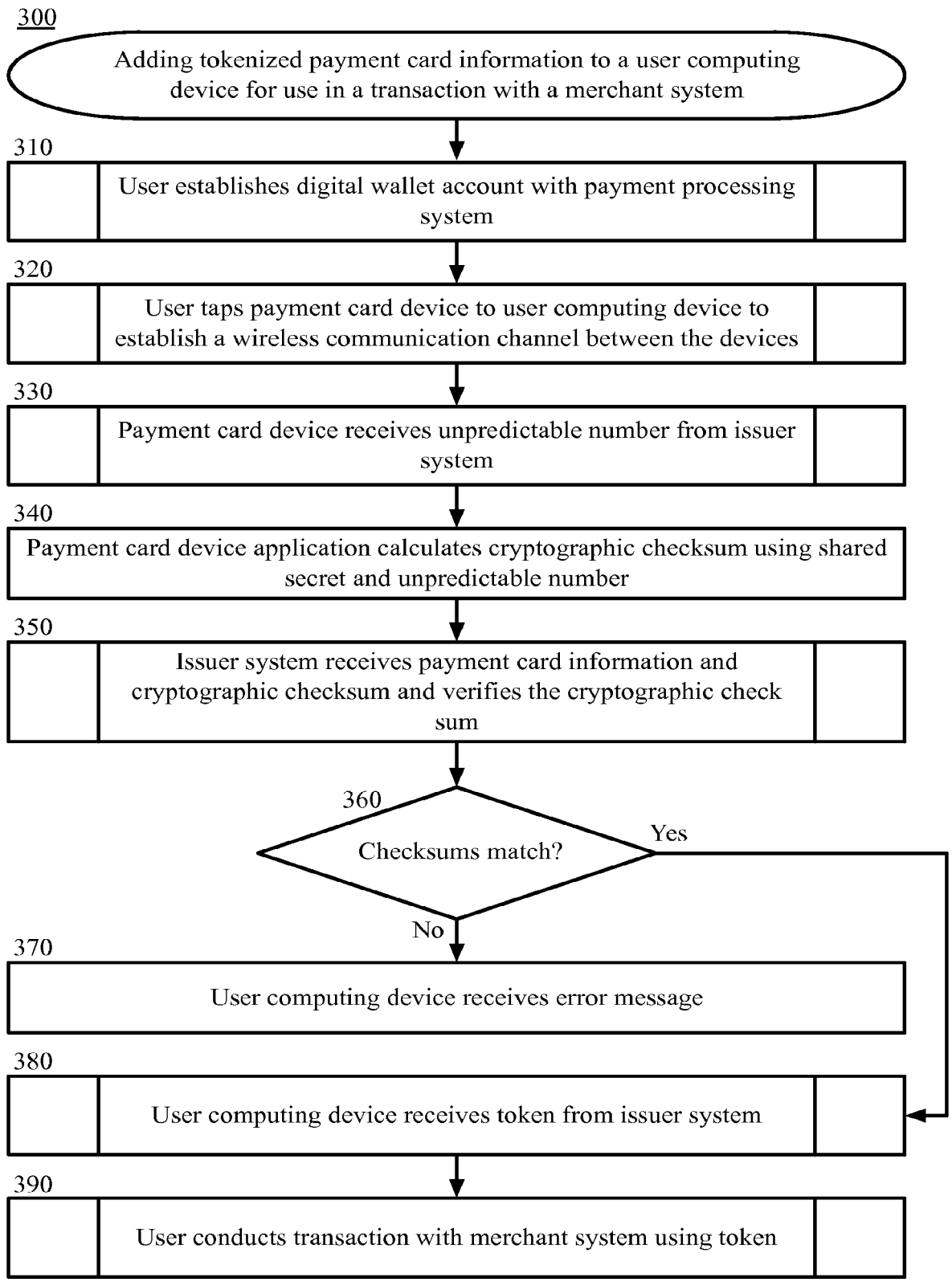
FIG. 3 is a block flow diagram depicting a method for adding a tokenized payment card to a user computing device for use in a transaction with a merchant system, in accordance with certain example embodiments.

FIG. 3 is a block diagram depicting a method 300 for adding tokenized payment card information to a user computing device 110 for use in a transaction with a merchant system 150, in accordance with certain example embodiments. The method 300 is described with reference to the components illustrated in FIG. 1.

In block 310, the user 101 establishes a digital wallet account with the payment processing system 130. The method for establishing a digital wallet account with the payment processing system 130 is described in more detail hereinafter with reference to the method described in FIG. 4.

Figure 4:
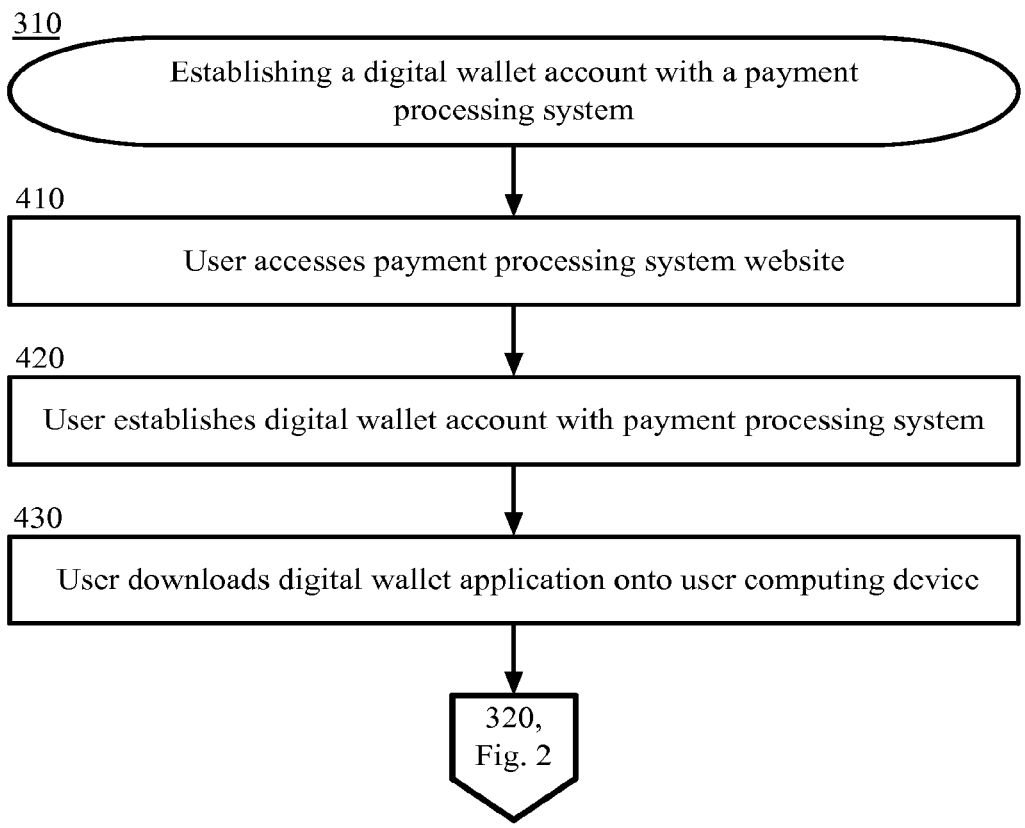
FIG. 4 is a block flow diagram depicting a method for establishing a digital wallet account with a payment processing system, in accordance with certain example embodiments.

FIG. 4 is a block diagram depicting a method 310 for establishing a digital wallet account with a payment processing system 130, in accordance with certain example embodiments. The method 310 is described with reference to the components illustrated in FIG. 1.

In block 410, the user 101 accesses a payment processing system 130 website. In an example embodiment, the user 101 accesses the payment processing system 130 website (not depicted) via the web browser 117 of the user computing device 110. For example, the user 101 enters the website address in the address bar of the web browser in order to access the website. In another example embodiment, the user 101 accesses the payment processing system 130 website using an application resident on the user computing device 110. For example, the user 101 selects an application on the user computing device 110 that connects the user 101 to the payment processing system 130 website.

In block 420, the user 101 establishes a digital wallet account with the payment processing system 120. In an example embodiment, the user 101 registers a username and a password associated with the user account to use to sign in to the digital wallet account. In an example embodiment, the user account is further associated with an email service, a messaging service, a gaming service, or a mapping service. In another example embodiment, the user account is associated with multiple services in addition to the digital wallet account. In an example embodiment, the user 101 may enter payment account information into the digital wallet account via the user computing device 110. For example, the user 101 may enter payment account information associated with one or more bank accounts, debit cards, credit cards, or other accounts into the digital wallet account using the user computing device 110.

In block 430, the user 101 downloads a digital wallet application 115 onto the user computing device 110. In an example embodiment, the digital wallet application 115 communicates with the payment processing system 130 over the network 160. In an example embodiment, the digital wallet application 115 is associated with the user 101 account and is operable to allow the user 101 to access the user account and/or services provided by the payment processing system 130. In another example embodiment, the user 101 may download various applications associated with the user account from the payment processing system 130. In another example embodiment, the digital wallet application 115 is downloaded on the user computing device 110 before the user 101 establishes the user account with the payment processing system 130. In certain example embodiments, the user 101 does not download the digital wallet application 115 onto the user computing device 110.

From block 430, the method 310 proceeds to block 320 of FIG. 3.

Returning to FIG. 3, in block 320, the user 101 taps the payment card device 120 to the user computing device 110 to establish a wireless communication channel between the devices. The method for tapping the payment card device 120 to the user computing device 110 to establish a wireless communication channel between the devices is described in more detail hereinafter with reference to the method 320 described in FIG. 5.

Figure 5:
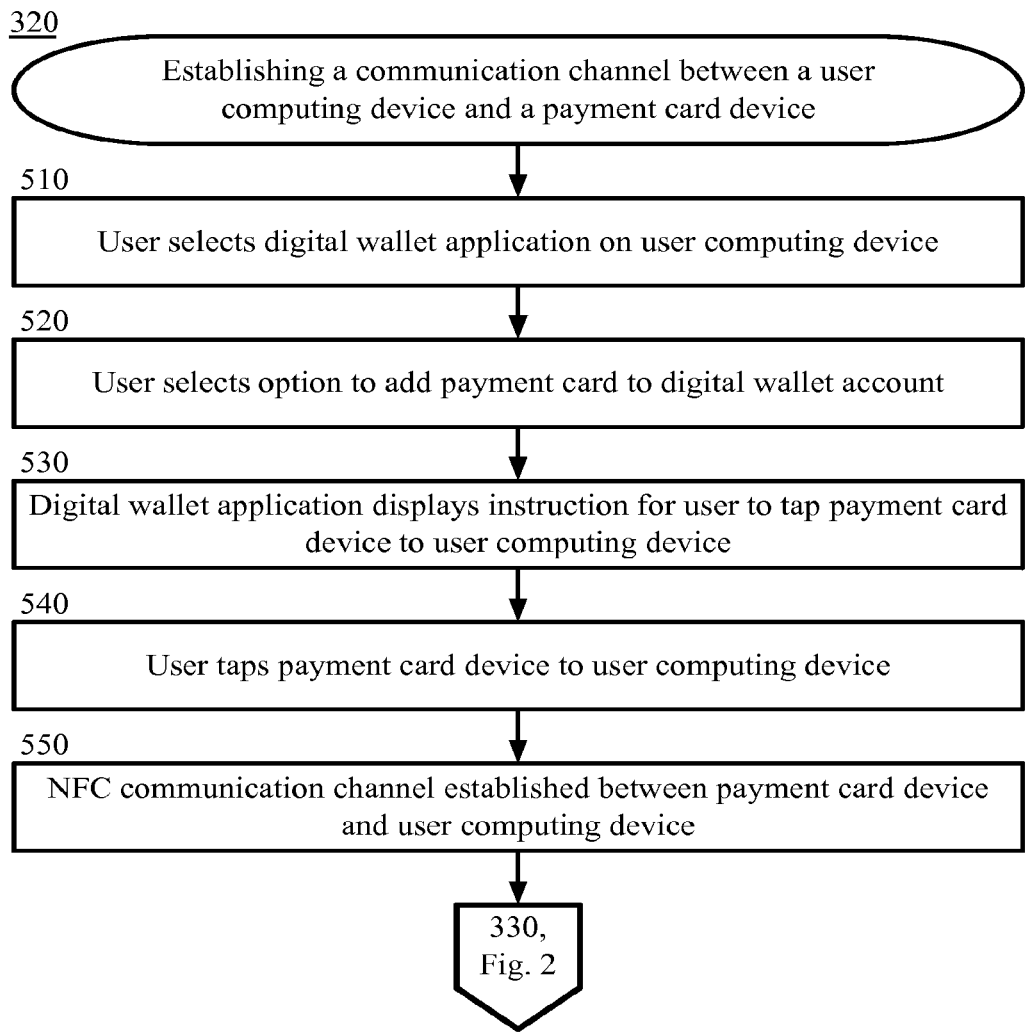
FIG. 5 is a block flow diagram depicting a method for establishing a communication channel between a user computing device and a payment card device, in accordance with certain example embodiments.

FIG. 5 is a block diagram depicting a method 320 for establishing a communication channel between a user computing device 110 and a payment card device 120, in accordance with certain example embodiments. The method 320 is described with reference to the components illustrated in FIG. 1.

In the example embodiments described herein, the digital wallet application 115 communicates with the payment processing system 130, which comprises the user's 101 digital wallet account. For example, the user 101 may access the user's 101 digital wallet account maintained by the payment processing system 130 via the digital wallet application 115 on the user computing device 110. In other example embodiments, instead of accessing the digital wallet account via the digital wallet application 115, the user 101 accesses the digital wallet account via a web browser 117 application using the user computing device 110. In the example embodiments described herein, one or more functions performed by the digital wallet application 115 may also be performed by a web browser 117 application communicating with the payment processing system 130. Likewise, one or more functions performed by the web browser 117 application communicating with the payment processing system 130 may also be performed by the digital wallet application 115.

In block 510, the user 101 selects the digital wallet application 115 on the user computing device 110. In an example embodiment, the user 101 selects an object on the user interface 116 associated with the digital wallet application 115 to access the digital wallet application 115. For example, the user 101 touches an icon on the user interface 116 of the user computing device 110 to access the digital wallet application 115.

In block 520, the user 101 selects an option to add a payment card to the digital wallet account. In an example embodiment, the user 101 desires to add payment card information associated with the payment card device 120 to the user's 101 digital wallet account. In an example embodiment, the user 101 selects an object on the user interface 116 associated with the digital wallet application 115 to select the option to add the payment card to the digital wallet account. For example, the user 101 touches an icon on the user interface 116 of the user computing device 110.

In block 530, the digital wallet application 115 displays an instruction for the user to tap the payment card device 120 to the user computing device. For example, the digital wallet application 115 or web browser 117 application may display an instruction on the user interface 116 that reads "please tap the payment card you desire to add to your mobile device." In an example, the digital wallet application 115 may display more detailed instructions that would enable a user 101 to understand how to tap a payment card to the user computing device 110.

In an example embodiment, in response to the user 101 selecting an option to add a payment card to the digital wallet account, the digital wallet application 115 or web browser 117 application activates a reader mode on the user computing device 110. In an example embodiment, the reader mode comprises configuring the user computing device 110 to be able to request, read, and/or receive payment account information from a payment card device 120. In an example embodiment, the digital wallet application 115 disables conflicting modes on the user computing device 110. In an example embodiment, the user computing device 110 is configured to share information with other devices when an NFC wireless communication channel is established between the user computing device 110 and the other devices. In another example embodiment, the user computing device 110 is configured to share information with other devices when a Bluetooth wireless communication channel or Wi-Fi wireless communication channel is established between the user computing device 110 and the other devices.

In an example embodiment, the user computing device 110 is able to receive and transmit information to the payment card device 120. However, in order to securely receive payment account information to process the payment transaction, this communication mode must be disabled to enable a "reader-only" communication mode. For example, automatic identification beaming may be configured on the user computing device 110 to share information with other reader mode devices in NFC proximity. This automatic identification beaming interferes with retrieving payment account information via the NFC wireless communication channel. Therefore, the automatic identification beaming functionality must be disabled when the user computing device 110 is configured to read payment account information via the NFC wireless communication channel. In example embodiment, the digital wallet application 115 disables conflicting modes on the user computing device 110 in response to the activation of the reader mode. In another example embodiment, a conflicting mode enabling communication with other devices over a network 160 interferes with the ability of the user computing device 110 to establish the NFC wireless communication channel. For example, a user computing device 110 such as a mobile phone may be prevented from establishing or maintaining an NFC wireless communication channel with a payment card device 120 if it receives or sends information to other devices over a cellular network 160.

In block 540, the user 101 taps the payment card device 120 to the user computing device 110. In an example embodiment, the user 101 arranges the physical locations and/or physical orientations of the payment card device 120 and/or the user computing device 110 so that the payment card device 120 and the user computing device 110 are within a threshold proximity necessary to establish and maintain an NFC communication channel. In an example embodiment, the required proximity distance between the devices (including devices 110 and 120) is defined by the type of RF wireless communication channel established. For example, NFC communication distances generally range from about 3 to about 4 inches. In an example embodiment, the user 101 "taps" the NFC-enable payment card device 120 in the RF field of the user computing device 110 by moving the payment card device 120 within the predefined proximity of the user computing device 110. In an example embodiment, the predefined proximity is based at least in part on the strength of the generated RF field and/or the type of wireless communication used by the devices (including devices 110 and 120).

In block 550, an NFC communication channel is established between the payment card device 120 and the user computing device 110. In an example embodiment, the user computing device 110 detects the presence of the payment card device 120. In an example embodiment, the user computing device 110 detects when the payment card device 120 is moved into the RF field and/or moved within the predefined proximity of the user computing device 110. In another example embodiment, the payment card device 120 detects the user computing device 110. In an example embodiment, the detection of the physical proximity of the payment card device 120 ensures that the user computing device 110 is communicating with only one payment card device 120. In another example embodiment, the detection of the physical proximity of the payment card device 120 ensures that the payment card device 120 is physically present within the RF field generated by the user computing device 110.

In an example embodiment, the payment card device application 135 is activated by the RF field generated by the user computing device 110. In an example embodiment, the payment card device application 125 is activated when the payment card device 120 detects the RF field generated by the antenna 111 of the user computing device 110. In an example embodiment, an NFC-enabled tag or component of the payment card device 120 is activated and/or energized by the RF field generated by the user computing device 110.

In an example embodiment, user computing device 110 requests a secure communication channel with the payment card device 120. In an example embodiment, the user computing device digital wallet application 115 and the payment card device application 125 establish any number of protocols to enable a secure communication, including but not limited to NFC protocols In an example embodiment, the user computing device 110 and the payment card device 120 exchange a key to set up a secure wireless communication channel. In an example embodiment, a Wi-Fi secure network 160 can comprise secure communication functionality, such as cryptographic protocols, including transport layer security or secure socket layer protocols, or other secure communication methodology.

In an example embodiment, the payment card device 120 receives the secure communication channel request. In another example embodiment, the user computing device 110 receives the communication channel network request from the payment card device 120. In an example embodiment, the payment card device 120 accepts the secure communication channel request. In another example embodiment, the user computing device 110 accepts the secure communication channel request. In an example embodiment, during this process, the payment card device 120 and the user computing device 110 establish a secure communication relationship by creating an encryption key for use in encrypting communications between the devices (including devices 110 and 120). In an example embodiment, the payment card device 120 does not accept the secure communication channel request from user computing devices 110 if the user computing device 110 does not have a required certificate within its secure element 114. For example, a payment card device 120 only accepts secure communication channel requests from a requesting digital wallet application 115 on a user computing device 110 that has a certificate from the financial institution associated with the payment card device 120. In another example embodiment, the payment card device 120 determines whether to accept the secure communication channel request by determining whether the user computing device 110 and/or the digital wallet application 115 has access to proper public keys or tokens. In yet another example embodiment, the user computing device 110 makes this determination.

From block 550, the method 320 proceeds to block 330, in FIG. 3.

Returning to FIG. 3, in block 330, the payment card device 120 receives an unpredictable number from the issuer system 140. The method for receiving an unpredictable number from the issuer system 140 is described in more detail hereinafter with reference to the method 330 described in FIG. 6.

Figure 6:
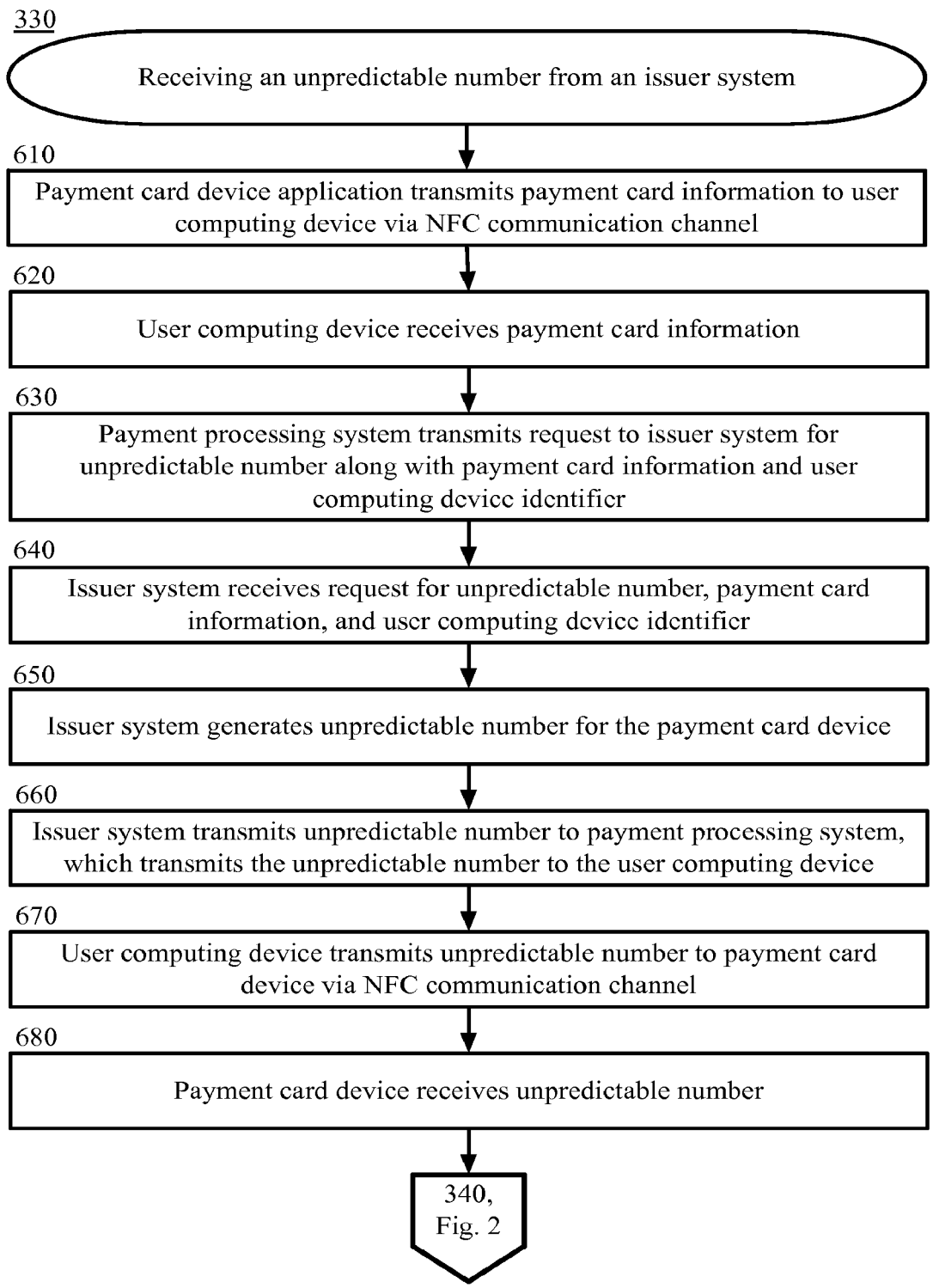
FIG. 6 is a block flow diagram depicting a method for requesting an unpredictable number from an issuer system, in accordance with certain example embodiments.

FIG. 6 is a block diagram depicting a method 330 for receiving an unpredictable number from an issuer system 140, in accordance with certain example embodiments. The method 330 is described with reference to the components illustrated in FIG. 1.

In block 610, the payment card device application 125 transmits payment card information to the user computing device 110 via the NFC communication channel. In an example embodiment, the payment account information comprises financial account information associated with the payment card device 120. In an example embodiment, the payment account information comprises financial account information and account verification information. In an example embodiment, the financial account information comprises information for a credit account, debit account, bank account, or other form of financial account information. In another example embodiment, the payment account information comprises secure information contained in a secure memory, secure element 124, or secure sub-device of the payment card device 120 that conforms to a standardized protocol (such as a Europay, MasterCard, and VISA (EMV) protocol).

In an example embodiment, the digital wallet application 115 transmits a payment card information request to the payment card device 120 instructing the payment card device 120 to transmit payment card information. In an example embodiment, the payment card information is retrieved by the payment card device application 125 from the secure element 114 and/or data storage unit 123.

In block 620, the user computing device 110 receives the payment card information. In the example embodiments described herein, the digital wallet application 115 resident on the user computing device 110 communicates with the payment processing system 130. In an example embodiment, the digital wallet application 115 communicates the received payment card information to the payment processing system 130 over the network 160. In this example embodiment, the payment processing system 130 receives the payment card information from the user computing device 110 over the network 160.

In block 630, the payment processing system 130 transmits a request to the issuer system 140 for an unpredictable number along with the payment card information and a user computing device 110 identifier. An example user computing device identifier is an identifier specific to the user computing device 110, such as a MAC ID or a hardware ID.

In block 640, the issuer system 140 receives the request for the unpredictable number, the payment card information, and the user computing device 110 identifier. In an example embodiment, the issuer system 140 associates the unpredictable number with the payment card information associated with the payment card device 120 and the user computing device 110 identifier. For example, the issuer system 140 comprises a database wherein payment card information for user accounts is associated with financial account information, the shared secret, the user computing device 110 identifier, an unpredictable number, and any other information relevant to a user's 101 financial account with the issuer system 140. In an example, the database is in a tabular format. In an example, the database comprises user 101 records for each user 101 having a financial account associated with the issuer system 140.

In block 650, the issuer system 140 generates an unpredictable number for the payment card device 120. In an example embodiment, the issuer system 140 comprises a random number generator with which the issuer system 140 generates the unpredictable number. In an example embodiment, the issuer system 140 associates the unpredictable number with the payment card information, the financial account information, the shared secret, the user computing device 110 identifier, and any other information relevant with the user's 101 financial account with the issuer system 140 in a database. For example, the issuer system 140 inserts the generated unpredictable number under the user's 101 record in the issuer system 140 database. In an example embodiment, the issuer system 140 generates a data item. For example, the data item may comprise a random number or an unpredictable number. In this example embodiment, the data item may be any suitable data item that can be used by the payment card device 130 and/or issuer system 140, along with the shared secret, to create a cryptographic checksum. In the example embodiments described herein, functions performed using the unpredictable number may also be performed using the data item generated by the issuer system 140.

In block 660, the issuer system 140 transmits the unpredictable number to the payment processing system 130, which transmits the unpredictable number to the user computing device 110. For example, the issuer system 140 transmits the unpredictable over the network 160 to the payment processing system 130. In this example embodiment, the payment processing system 130 receives the unpredictable number over the network 160 and transmits the unpredictable number to the user computing device 110 via the network 160.

In the example embodiments described herein, the digital wallet application 115 resident on the user computing device 110 communicates with the payment processing system 130. In an example embodiment, the payment processing system 130 communicates the unpredictable number to the digital wallet application 115 resident on the user computing device 110 over the network 160.

In block 670, the user computing device 110 transmits the unpredictable number to the payment card device 120 via the NFC communication channel. In an example embodiment, the original NFC wireless communication channel established before the user computing device 110 receives payment card information is maintained between the user computing device 110 and the payment card device 120.

In block 680, the payment card device 120 receives the unpredictable number. In an example embodiment, the payment card device application 125 stores the unpredictable number on the secure element 124 and/or the data storage unit 123 on the payment card device 120.

From block 680, the method 330 proceeds to block 340, in FIG. 3.

Returning to FIG. 3, in block 340, the payment card device application 125 calculates a cryptographic checksum using the shared secret and the unpredictable number. In an example embodiment, the payment card device application 125 comprises an algorithm that is utilized to calculate the cryptographic checksum using the shared secret and the unpredictable number. In this example embodiment, the issuer system 140 configures the application 125 or causes the application 125 to be configured to calculate a cryptographic checksum in response to receiving an unpredictable number generated by the issuer system 140.

In an example embodiment, the application 125 uses a mathematical algorithm to calculate the cryptographic checksum based on the shared secret and the unpredictable number. In another example embodiment, the application 125 rearranges, combines, and/or transforms elements of the unpredictable number and shared secret to produce the cryptographic checksum. In yet another example embodiment, the shared secret comprises a mathematical function and the cryptographic checksum comprises an output of the function when the unpredictable number is the input of the function. In an example embodiment, the application 115 uses a cryptographic algorithm, such as a triple data encryption standard algorithm ("3DES"), to compute the checksum based on the shared secret and unpredictable number. In an example embodiment, the shared secret comprises an encryption key used to encrypt data.

In block 350, the issuer system 140 receives the payment card information and the cryptographic checksum and verifies the cryptographic checksum. The method for receiving payment card information and the cryptographic checksum and verifying the cryptographic checksum is described in more detail hereinafter with reference to the method 350 described in FIG. 7.

Figure 7:
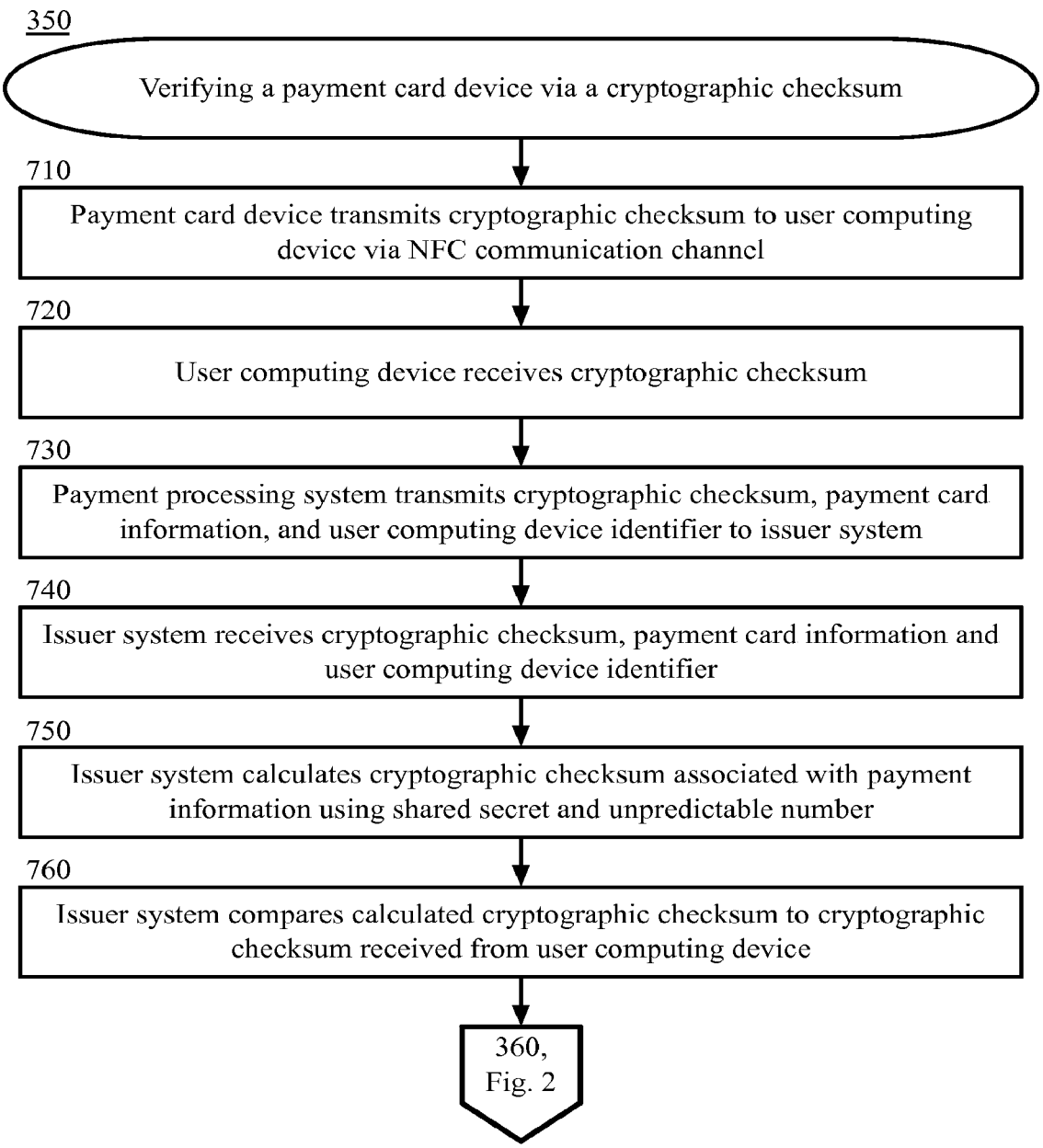
FIG. 7 is a block flow diagram depicting a method for verifying a payment card via a cryptographic checksum, in accordance with certain example embodiments.

FIG. 7 is a block diagram depicting a method 350 for verifying a payment card device 120 via a cryptographic checksum, in accordance with certain example embodiments. The method 350 is described with reference to the components illustrated in FIG. 1.

In block 710, the payment card device 120 transmits the cryptographic checksum to the user computing device 110 via the NFC communication channel. In an example embodiment, the user computing device 110 and payment card device 120 maintain the NFC communication channel between the devices used previously to transmit payment card information and the unpredictable number.

In block 720, the user computing device 110 receives the cryptographic checksum. In the example embodiments described herein, the digital wallet application 115 resident on the user computing device 110 communicates with the payment processing system 130. In an example embodiment, the digital wallet application 115 communicates the received cryptographic checksum to the payment processing system 130 over the network 160. In an example embodiment, the digital wallet application 115 resident on the user computing device 110 retrieves the user computing device 110 identifier and transmits the identifier to the payment processing system 130. In another example embodiment, the digital wallet account maintained by the payment processing system 130 comprises the user computing device 110 identifier and the payment processing system 130 accesses the user computing device 110 identifier from the digital wallet account.

In block 730, the payment processing system 130 transmits the cryptographic checksum, the payment card information, and the user computing device 110 identifier to the issuer system 140. In an example embodiment, the payment processing system 130 extracts the payment card information from the digital wallet account. In an example, the payment card information is stored in the data storage unit 133. In an example embodiment, the payment processing system 130 receives the user computing device 110 identifier from the user computing device 110 via the wireless NFC communication channel. In another example embodiment, the user's 101 digital wallet account maintained by the payment processing system 130 comprises the user computing device 110 identifier and the payment processing system 130 accesses the user computing device 110 identifier via the digital wallet account.

In block 740, the issuer system 140 receives the cryptographic checksum, the payment card information, and the user computing device 110 identifier. In an example embodiment, the issuer system 140 retrieves the shared secret and unpredictable number associated with the payment card information. In an example embodiment, the issuer system 140 accesses a database wherein shared secrets and unpredictable numbers are associated with corresponding payment card information and other relevant information for user 101 financial accounts with the issuer system 140.

In block 750, the issuer system 140 calculates a cryptographic checksum associated with the payment information using the shared secret and the unpredictable number. In an example embodiment, the issuer system 140 calculates the cryptographic checksum in the same manner as the payment card device 120 calculated the cryptographic checksum as described in block 340 of FIG. 3. For example, the issuer system 140 uses a mathematical algorithm to calculate the cryptographic checksum based on the shared secret and the unpredictable number. In another example embodiment, the issuer system 140 rearranges, combines, and/or transforms elements of the unpredictable number and shared secret to produce the cryptographic checksum. In yet another example embodiment, the shared secret comprises a mathematical function and the cryptographic checksum comprises an output of the function when the unpredictable number is the input of the function. For example, the shared secret comprises a cryptographic algorithm, such as a triple data encryption standard algorithm ("3DES"), to compute the checksum.

In block 760, the issuer system 140 compares the calculated cryptographic checksum to the cryptographic checksum received from the user computing device 110. In an example embodiment, the issuer system 140 compares each number, symbol, letter, and/or character of the two cryptographic checksums to determine the similarity between the two cryptographic checksums.

From block 760, the method 350 proceeds to block 360, in FIG. 3.

Returning to FIG. 3, in block 360, the issuer system 140 determines if the calculated cryptographic checksum matches the received cryptographic checksum. In an example embodiment, a match comprises an exact match between the two cryptographic checksums. In another example embodiment, a match comprises an exact match of at least a part or component of the two cryptographic checksums.

If the calculated cryptographic checksum does not match the received cryptographic checksum, the method 300 proceeds to block 370.

In block 370, the user computing device 110 receives an error message. In an example embodiment, the issuer system 140 transmits an error message to the payment processing system 130, which retransmits the error message to the user computing device 110. An example error message comprises a notice advising the user 101 that the payment card device 120 could not be verified by the issuer system 140. In an example embodiment, the user computing device 110 displays the error message on the user interface 116. In an example embodiment, the digital wallet application 115 and/or payment processing system 130 stores the payment card information in the user's 101 digital wallet account, but informs the user 101 that that the payment card device 120 could not be verified by the issuer system 140 and thus could not receive a token for use in a transaction. In this example embodiment, when the user 101 wishes to use the payment card information in a transaction, the user 101 may have to provide certain verification information that the user 101 would not have to provide if the issuer system 140 had issued a token for the user computing device 110. For example, the user 101 may have to provide an address, a card verification value ("CVV"), a zip code, or other verification information to use the payment card information. In an example embodiment, the digital wallet application 115 and/or payment processing system 130 does not store the payment card information in the user's 101 digital wallet account.

Returning to block 360, if the calculated cryptographic checksum matches the received cryptographic checksum, the method 300 proceeds to block 380.

In block 380, the user computing device 110 receives a token from the issuer system 140. The method for receiving a token from the issuer system 140 is described in more detail hereinafter with reference to the method 380 described in FIG. 8.

Figure 8:
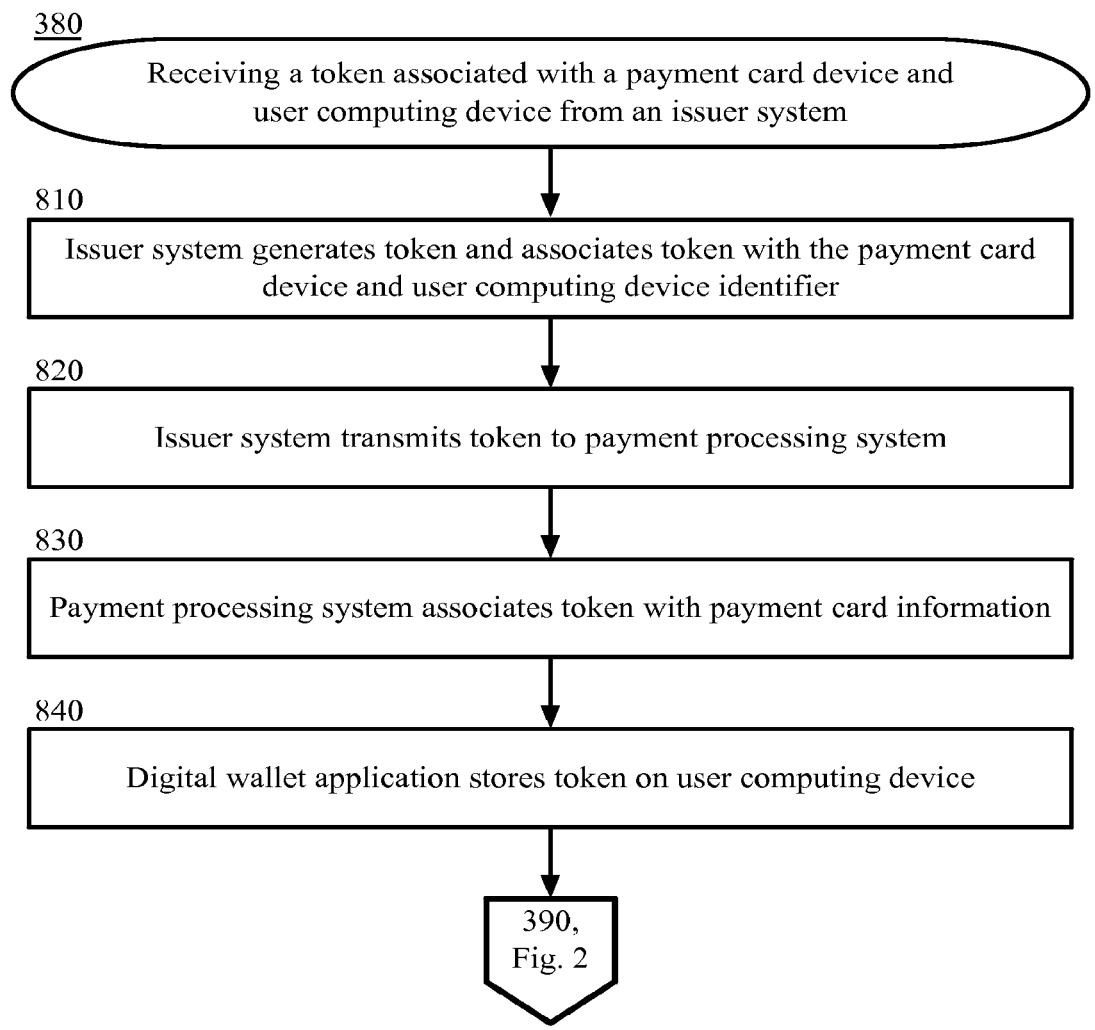
FIG. 8 is a block flow diagram depicting a method for receiving a token associated with a payment card and user computing device from an issuer system, in accordance with certain example embodiments.

FIG. 8 is a block diagram depicting a method 380 for receiving a token associated with a payment card device 120 and user computing device 110 from an issuer system 140, in accordance with certain example embodiments. The method 380 is described with reference to the components illustrated in FIG. 1.

In block 810, the issuer system 140 generates a token and associates the token with the payment card device 120 and the user computing device 110 identifier. In an example embodiment, the token comprises a virtual credit number. In this example embodiment, the issuer system 140 comprises a database with user 101 account information and the issuer system 140 associates the token with the payment card information and any other information associated with the user's 101 financial account with the issuer system 140. In an example embodiment, the issuer system 140 may recognize the token as associated with the user's 101 financial account in a payment authorization request received from the payment processing system 130. In an example embodiment, the issuer system 140 generates a token that is valid for a certain length of time. For example, the token is valid for 24 hours. In another example embodiment, the issuer system 140 generates a token that is valid for a particular merchant or particular type of merchant. In yet another example embodiment, the issuer system 140 generates a token that can be used in any transaction initiated by the user 101 at any point of sale device, for example, the merchant system point of sale device 155. In yet another example embodiment, the issuer system 140 generates a token that can be used in any online transaction initiated by the user 101, for example, a transaction the user 101 initiates with the merchant system website 157.

In block 820, the issuer system 140 transmits the token to the payment processing system 130. In an example embodiment, the payment processing system 130 receives the token from the issuer system 140 over the network 160.

In block 830, the payment processing system 130 associates the token with the payment card information. For example, the payment processing system 130 saves the token in the user's 101 digital wallet account and associates the token with the payment card information associated with the payment card device 120 in the user's 101 digital wallet account.

In block 840, the digital wallet application 115 stores the token on the user computing device 110. In the example embodiments described herein, the digital wallet application 115 resident on the user computing device 110 communicates with the payment processing system 130. In an example embodiment, the payment processing system 130 communicates the token to the digital wallet application 115 resident on the user computing device 110 over the network 160. In an example embodiment, the digital wallet application 115 or the user computing device 110 stores the token in the data storage unit 113 and/or secure element 114 resident on the user computing device 110. In certain example embodiments, the user computing device 110 stores the token on the secure element 114 or other secure memory (not illustrated). In certain other example embodiments, the user computing device 110 stores the token in other system memory (not illustrated) that may not be classified as secure.

From block 840, the method 380 proceeds to block 390, in FIG. 3.

Returning to FIG. 3, in block 390, the user 101 conducts a transaction with a merchant system 150 using the token. For example, the user 101 conducts the transaction using the token at a POS device 155. The method for conducting the transaction with the merchant system 150 using the token is described in more detail hereinafter with reference to the method 390 described in FIG. 9. In certain other example embodiments described herein, the user 101 conducts an online transaction with the merchant system 150 using the token via the user computing device 110.

Figure 9:
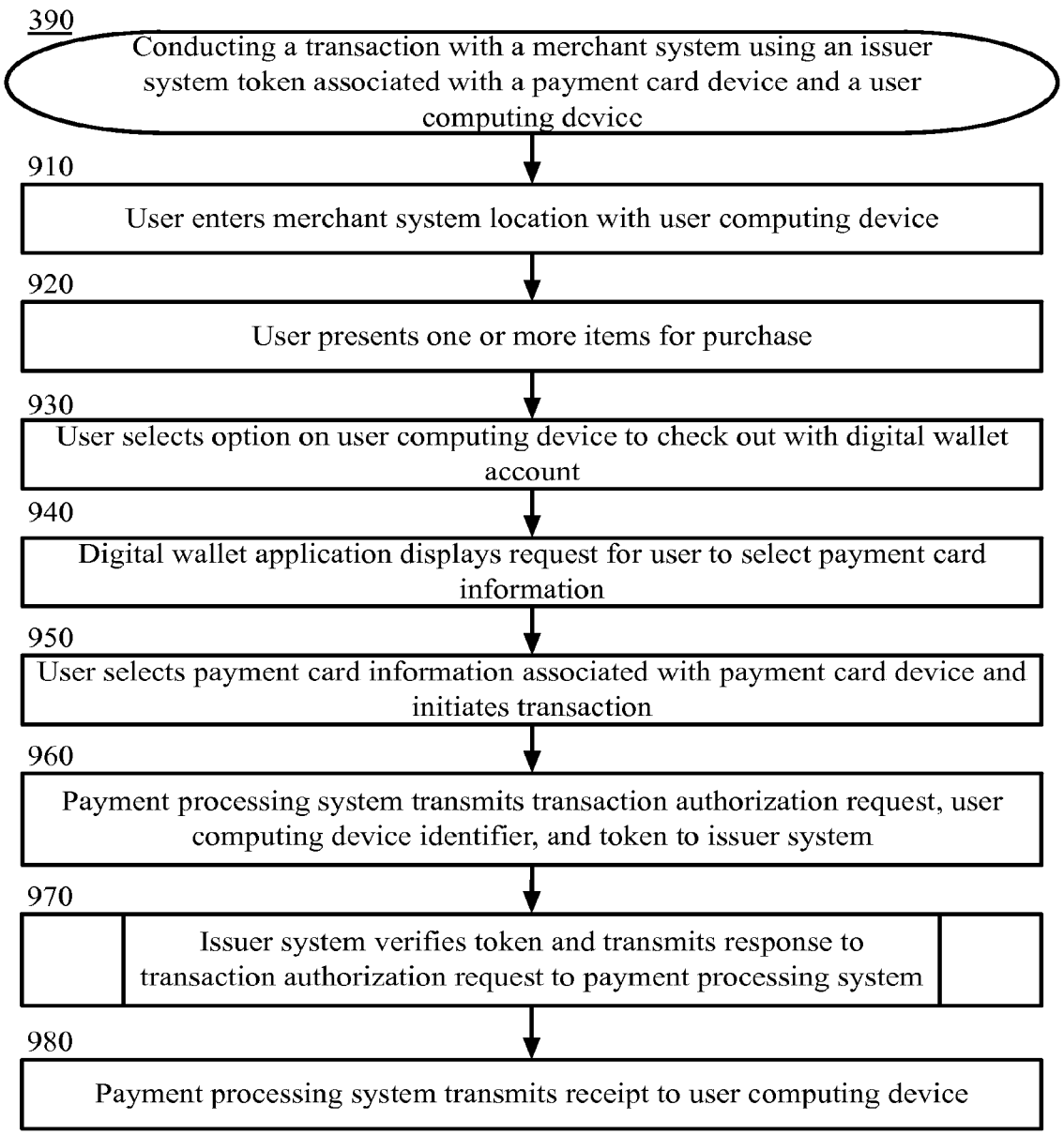
FIG. 9 is a block flow diagram depicting a method for conducting an online transaction with a merchant system using an issuer system token associated with a payment card device and a user computing device, in accordance with certain example embodiments.

FIG. 9 is a block diagram depicting a method 390 for conducting a transaction with a merchant system 150 using an issuer system 140 token associated with a payment card device 120 and a user computing device 110, in accordance with certain example embodiments. The method 390 is described with reference to the components illustrated in FIG. 1.

In block 910, the user 101 enters a merchant system 150 location with the user computing device 110. For example, the user 101 desires to purchase one or more items at a merchant system 150 physical store location and carries the user computing device 110 to the merchant system 150 location.

In certain other example embodiments, wherein the user conducts an online transaction, the user 101 accesses a merchant system website 157 using the user computing device 110 to conduct an online transaction with the merchant system 150. In an example embodiment, the user 101 enters the merchant website 157 address into the web browser 117 or otherwise accesses the merchant website 157 via the web browser 117. In an example, the user 101 actuates a user interface 116 object for a merchant system 150 advertisement on the web browser 117 and the web browser 117 redirects to the website 157. In another example embodiment, the user 101 accesses the merchant system website 157 via a merchant application (not shown) resident on the user computing device 110 that communicates with the merchant system 150 over the network 160. For example, the user 101 downloads the merchant application from the merchant system 150.

In block 920, the user presents one or more items for purchase. For example, the user 101 gathers one or more items that the user 101 desires to purchase and presents the items to an agent of the merchant system 150 at the POS device 155. For example, the POS device 155 comprises a cash register at the merchant system 150 store location. The POS device 155 also may comprise an NFC or other short range communication reader. In an example embodiment, the agent scans or otherwise enters descriptions of the one or more items into the POS device 155. In an example embodiment, the agent of the merchant system 150 notifies the user 101 of the total cost of the one or more items and communicates payment options to the user 101. For example, payment options at the POS device 155 may comprise payment by cash, credit or debit card, check, or via a digital wallet application on a user computing device 110.

In certain other example embodiments, wherein the user conducts an online transaction, the user 101 selects one or more items for purchase on the merchant system website 157. For example, the user 101 selects one or more items on the website 157 and selects an option to add the items to a virtual shopping cart on the merchant system website 157.

In block 930, the user 101 selects an option to check out with the digital wallet account. For example, the user 101 instructs the agent of the merchant system 150 operating the POS device 155 to select an option for the user 101 to pay using the digital wallet application operating on the user computing device 110. For example, the agent operating the POS device 155 actuates one or more interface objects on the POS device 155 to select the option to check out with the user's 101 digital wallet account. In certain embodiments, this action may be to select a credit or debit card type payment as the token on the digital wallet functions as a credit or debit card type of payment. Since credit and debit card payments are standard forms of payment options for many merchants, the agent may not have to select a particular payment type for the user to pay using the token in the digital wallet. In this example embodiment, the user 101 initiates a digital wallet transaction by tapping the user computing device 110 to the merchant system 150 POS device 155 to establish an NFC communication channel between the two devices. In this example embodiment, the user 101 may select an option on the digital wallet application 115 to configure the user computing device 110 before tapping the user computing device 110 to the POS device 155. For example, the user 101 may select an option on the digital wallet application 115 via the user interface 116 to conduct a digital wallet transaction with a POS device 155. In this example, the digital wallet application 115 may communicate with the NFC controller 112 to establish an NFC wireless communication channel with the merchant system 150 POS device 155 in response to the user 101 tapping the user computing device 110 to the POS device 155 within a pre-defined proximity of an antenna of the POS device 155.

In an example embodiment, the merchant system 150 POS device 155 communicates transaction details to the user computing device 110 via the NFC wireless communication channel. In another example embodiment, the merchant system 150 POS device 155 communicates transaction details to the payment processing system 130 over the network 160. For example, transaction details may comprise a total amount of the transaction initiated by the user 101, a list of items and corresponding prices in the transaction, a merchant system 150 account number associated with a financial institution, and any other useful or relevant information that the payment processing system 130 and/or user computing device 110 digital wallet application 115 may use to process the user-initiated transaction. In this example embodiment, the payment processing system 130 and/or the user computing device 110 receives the transaction details transmitted by the merchant system website POS device 155.

In certain other example embodiments, wherein the user conducts an online transaction, the user 101, to select an option to check out with the digital wallet account, actuates a user interface 111 object to select an option to checkout on the website 157. In an example embodiment, the merchant system website 157 displays one or more options for checkout. In this example embodiment, the merchant system website 157 may display an option for the user 101 to check out using the digital wallet account associated with the payment processing system 130. In an example embodiment, the merchant system website 157 communicates transaction details to the user computing device 110 and/or the payment processing system 130 over the network 160. For example, transaction details may comprise a total amount of the transaction initiated by the user 101, a list of items and corresponding prices in the transaction, a merchant system 150 account number associated with a financial institution, and any other useful or relevant information that the payment processing system 130 and/or user computing device 110 digital wallet application 115 may use to process the user-initiated transaction. In this example embodiment, the payment processing system 130 and/or the user computing device 110 receives the transaction details transmitted by the merchant system website 157. For example, the payment processing system 130 receives the transaction details from the merchant system website 157 over the network 160 and communicates the transaction details to the user computing device 110 via the network 160.

In block 940, the digital wallet application 115 displays a request for the user 101 to select payment card information. In an example embodiment, the payment processing system 130 receives a notice from the merchant system website 157 or the merchant system 150 POS device 155 that the user requests to initiate a transaction with the merchant system 150 using the digital wallet account. In another example embodiment, the digital wallet application 115 receives the notice from the merchant system website 157 or merchant system 150 POS device 155 that the user 101 requests to initiate a transaction with the digital wallet account via the network 160 or the wireless communication channel, respectively. In an example embodiment, the digital wallet application 115 displays the request for the user 101 to select payment card information in response to receiving notification of the user's 101 desire to initiate a transaction using the digital wallet account from the payment processing system 130, the merchant system 150 POS device 155, and/or the merchant system website 157. In an example embodiment, the digital wallet application 115 displays, via the user interface 116, one or more user interface 116 objects associated with one or more payment cards. For example, the digital wallet application 115 may display an option for the user 101 to select payment card information corresponding to the payment card device 120, one or more credit cards, one or more bank accounts, and/or one or more debit cards. In certain example embodiments, the selection of payment card information is performed prior to tapping the user computing device 110 with the POS device 155. Alternatively, a default payment card can be configured in the digital wallet application 115 for use during each subsequent tap.

In block 950, the user 101 selects payment card information associated with the payment card device 120 and initiates a transaction. In an example embodiment, the user 101 selects the payment card device 120 information by actuating one or more objects on the user interface 116. In an example embodiment, the digital wallet application 115 transmits to the payment processing system 130, via the network 160, notification of the user 101 selection of the payment card information corresponding to the payment card device 120. In an example embodiment, the user 101 selects and/or enters additional information for the transaction such as a shipping address, a telephone contact number, and/or one or more shipping preferences.

In block 960, the payment processing system 130 transmits a transaction authorization request, the user computing device 110 identifier, and the token to the issuer system 140. In an example embodiment, the digital wallet application 115 extracts the token from the data storage unit 113 or the secure element 114 in response to receiving the user 101 actuation of the user interface 116 object. In an example embodiment, the digital wallet application 115 extracts the user computing device 110 identifier from the data storage unit 113 or the secure element 114. In an example embodiment, the transaction authorization request comprises the total currency amount of the transaction, an account number of the merchant system, and any other relevant information for the transaction. For example, the payment processing system 130 received the total amount, the merchant system 150 account number, and other relevant information from the merchant system website 157 or merchant system 150 POS device 155 when the user 101 initiated the transaction. In this example, the payment processing system 130 transmits the total amount, the merchant system 150 account number, and the token to the issuer system 140 in the transaction authorization request. In an example embodiment, the token comprises a virtual credit number for which the issuer system 140 has payment card information corresponding to the payment card device 120.

In block 970, the issuer system verifies the token and transmits a response to the transaction authorization request to the payment processing system 130. The method for verifying tokenized payment card information is described in more detail hereinafter with reference to the method 970 described in FIG. 10.

Figure 10:
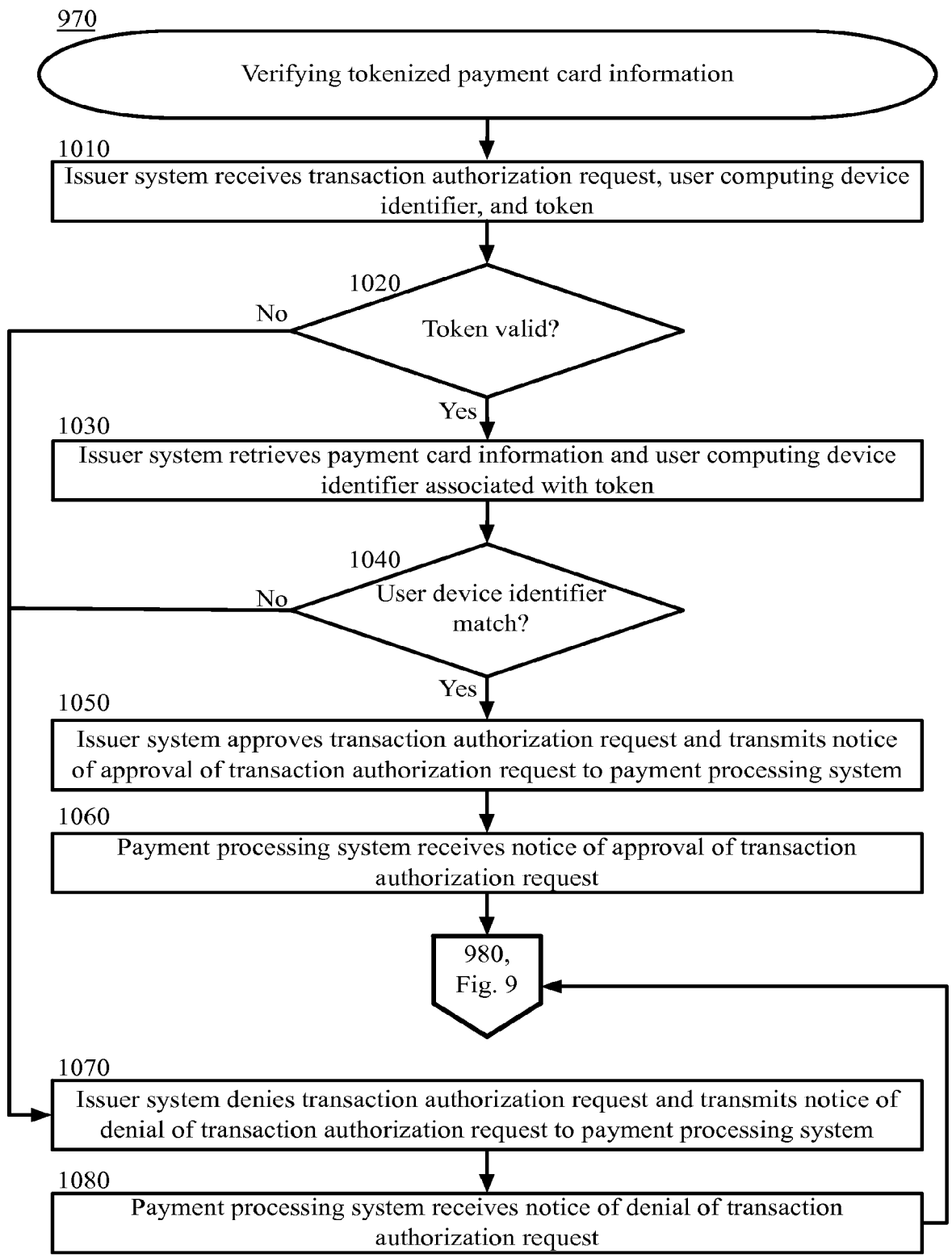
FIG. 10 is a block flow diagram depicting a method for verifying a tokenized payment card, in accordance with certain example embodiments.

FIG. 10 is a block diagram depicting a method 970 for verifying tokenized payment card information, in accordance with certain example embodiments. The method 970 is described with reference to the components illustrated in FIG. 1.

In block 1010, the issuer system 140 receives the transaction authorization request, the user computing device 110 identifier, and the token. In an example embodiment, the issuer system 140 receives the transaction authorization request, the user computing device 110 identifier, and the token via the network 160.

In block 120, the issuer system 140 determines whether the token is valid. In an example embodiment, the token is only valid for use in transactions that are initiated within a certain period of time. For example, the token is valid for transactions initiated by the user 101 up to 24 hours after the issuer system 140 generates the token. In another example embodiment, the token is only valid for transactions involving certain merchant systems 150, a particular merchant system 150, or a particular class or classes of merchant systems 150. In this example embodiment, the issuer system 140 may receive a merchant identifier along with the transaction authorization request comprising a merchant name or a merchant class. In this example embodiment, the issuer system 140 determines that the token is valid or invalid for use in the transaction based on the merchant name or the merchant class. In yet another example embodiment, the token is valid for use in any user 101 initiated online transaction.

If the token is not valid, the method 970 proceeds to block 1070.

In block 1070, the issuer system 140 denies the transaction authorization request and transmits a notice of denial of transaction authorization request to the payment processing system 130. In an example embodiment, the issuer system 140 comprises a database comprising information associated with the token. For example, the issuer system 140 extracts a record from the database associated with the token. In this example, the record states that the token is valid for 24 hours. In this example, 36 hours has passed since the token was produced, therefore the issuer system 140 determines that the token is invalid for use in the requested transaction. In another example, the issuer system 140 receives a merchant identifier along with the transaction authorization request from the user computing device 110. In this example, the issuer system 140 determines, from the database, that the token is valid only for merchants in class A. However, in this example, the issuer system 140 categorizes the received merchant identifier as class B, therefore the issuer system 140 determines that the token is invalid for use in the requested transaction. In another example embodiment, the issuer system 140 transmits the notice of denial of transaction authorization request to the user computing device 110 over the network 160.

In block 1080, the payment processing system 130 receives notice of the denial of the transaction authorization request. In an example embodiment, the payment processing system 130 transmits the notice of denial of the transaction authorization request to the user computing device 110 for display on the user computing device 110. In an example embodiment, the payment processing system 130 notifies the user 101 of the denial of the transaction authorization request via email, text message, or display on the digital wallet application 115. In another example embodiment, the payment processing system 130 posts the notice of the denial of the transaction authorization request in the user's 101 digital wallet account. In this example embodiment, the user 101 may access the user's 101 digital wallet account via the user computing device 110 web browser 117 or digital wallet application 115 to view the notice of denial of the transaction authorization request. In another example embodiment, the user computing device 110 receives the notice of the denial of the transaction authorization request directly from the issuer system 140 over the network 160.

The method 970 then proceeds to block 980 in FIG. 9.

Returning to FIG. 10, in block 1020, if the token is valid, the method 970 proceeds to block 1030. In an example embodiment, the issuer system 140 comprises a database comprising information associated with the token. For example, the issuer system 140 extracts a record from the database associated with the token. In this example, the record states that the token is valid for 24 hours. In this example, 18 hours has passed since the token was produced, therefore the issuer system 140 determines that the token is valid for use in the requested transaction. In another example, the issuer system 140 receives a merchant identifier along with the transaction authorization request from the user computing device 110. In this example, the issuer system 140 determines, from the database, that the token is valid only for merchants in class A. In this example, the issuer system 140 categorizes the received merchant identifier as class A, therefore the issuer system 140 determines that the token is valid for use in the requested transaction. In yet another example, the issuer system 140 determines that there are no restrictions on use of the token in a transaction initiated by the user 101, therefore the issuer system 140 determines that the token is valid for use in the requested transaction.

In block 1030, the issuer system 140 retrieves the payment card information and the user computing device identifier associated with the token. In an example embodiment, the issuer system 140 accesses a database comprising a record comprising the user's 101 name, financial account number, token, financial account information, payment card device 120 information, user computing device 110 identifier, unpredictable number, and the shared secret associated with the payment card device 120. In this example embodiment, the issuer system 140 extracts the payment card device 120 information from the user's 101 record in the database.

In block 1040, the issuer system 140 determines whether the user computing device 110 identifier associated with the token matches the user computing device 110 identifier received from the payment processing system 130 with the payment authorization request. In an example embodiment, the issuer system 140 extracts the user computing device 110 identifier associated with the token from the user's 101 record in the issuer system 140 database. In an example embodiment, the issuer system 140 compares the received user computing device 110 identifier to the user computing device 110 identifier associated with the token stored by the issuer system 140. In an example embodiment, a match between the two user computing device 110 identifiers comprises a 100% similarity between the identifiers. For example, user computing device 110 identifier 11100XYZ222 matches user computing device 110 identifier 11100XYZ222 but does not match user computing device 110 identifier 99900ABC555. In another example embodiment, the issuer system 140 does not determine whether the user computing device 110 identifier associated with the token matches the user computing device 110 identifier received from the payment processing system 130 with the payment authorization request. For example, the issuer system 140 only verifies the checksum and not the user computing device 110 identifier.

If the user computing device 110 identifiers do not match, the method 970 proceeds to block 1070.

In block 1070, the issuer system 140 denies the transaction authorization request and transmits a notice of denial of transaction authorization request to the payment processing system 130. In an example embodiment, the issuer system 140 transmits the notice of denial of transaction authorization request to the payment processing system 130 over the network 160. In another example embodiment, the issuer system 140 transmits the notice of denial of transaction authorization request to the user computing device 110 over the network 160.

In block 1080, the payment processing system 130 receives notice of the denial of the transaction authorization request. In an example embodiment, the payment processing system 130 transmits the notice of denial of the transaction authorization request to the user computing device 110 for display on the user computing device 110. In an example embodiment, the payment processing system 130 notifies the user 101 of the denial of the transaction authorization request via email, text message, or display on the digital wallet application 115. In another example embodiment, the payment processing system 130 posts the notice of the denial of the transaction authorization request in the user's 101 digital wallet account. In this example embodiment, the user 101 may access the user's 101 digital wallet account via the user computing device 110 web browser 117 or digital wallet application 115 to view the notice of denial of the transaction authorization request. In another example embodiment, the user computing device 110 receives the notice of the denial of the transaction authorization request directly from the issuer system 140 over the network 160.

In an example embodiment, the payment processing system 130 notifies the merchant system POS device 155 or the merchant system website 157 that the transaction was unsuccessful. In an example online transaction, the merchant system web site 157 notifies the user 101 via email, text message, or other means that the transaction was unsuccessful. In an example in-store transaction, the merchant system 150 POS device 155 notifies the user 101 that the transaction was unsuccessful via printing a receipt which an agent hands to the user 101 at the merchant system 150 location, via email, via text message, or via other means.

The method 970 then proceeds to block 980 in FIG. 9.

Returning to FIG. 10, in block 1040, if the user computing device 110 identifiers match, the method 970 proceeds to block 1050.

In block 1050, the issuer system 140 approves the transaction authorization request and transmits a notice of approval of payment request to the payment processing system 130. In an example embodiment, the issuer system 140 may approve the transaction authorization request based on the user's 101 account balance or credit balance associated with the payment card device 120 or a transaction history associated with the payment card device 120. For example, the issuer system 140 may deny the transaction authorization request if the user 101 has exceeded an allowed credit balance even if the token is valid and the received user computing device 110 identifier matches the user computing device 110 identifier associated with the token.

In an example embodiment, the issuer system 140, upon approval of the transaction authorization request, charges the user's 101 financial account with the issuer system 140 and schedules a payment to the merchant system 150 account identified in the received transaction authorization request. In an example embodiment, the issuer system 140 bills the user 101 for the transaction amount and the user 101 makes a payment to the issuer system 140 at a later time to satisfy the transaction amount balance on the user's 101 financial account. For example, the user 101 receives a statement for a credit account associated with the issuer system 140 for the payment card device 120 associated with the token that the user 101 used in the transaction.

In block 1060, the payment processing system 130 receives the notice of approval of transaction authorization request. In an example embodiment, the payment processing system 130 maintains a transaction history for the user 101 on the user's digital wallet account and the payment processing system 130 updates the user's 101 transaction history upon receiving the notice of approval of the transaction authorization request. In an example embodiment, the payment processing system 130 notifies the merchant system website 157 or the merchant system 150 POS device 155 that the transaction was successful. In an example embodiment, the merchant system website 157 notifies the user 101 via email, text message, or other means that the transaction was successful and provides relevant transaction details. In another example embodiment, the merchant system 150 POS device 155 notifies the user 101 that the transaction was successful and provides relevant transaction details via printing a receipt which an agent hands to the user 101 at the merchant system 150 location, via email, via text message, or via other means.

The method 970 then proceeds to block 980 in FIG. 9.

Returning to FIG. 9, in block 980, the payment processing system 130 transmits a receipt to the user computing device 110. In an example embodiment, the payment processing system transmits the receipt to the digital wallet application 115 or via email or text message to the user computing device 110. In an example embodiment, in which the issuer system 140 approved the payment authorization request, the receipt comprises a summary of the transaction or a notice to check the user's 101 transaction history in the user's 101 digital wallet account for a summary of the transaction. For example, the user 101 receives a notification on the digital wallet application 115 to check the user's 101 transaction history. In other example embodiments, in which the issuer system 140 denied the payment authorization request, the receipt comprises notification to the user 101 that the transaction was unsuccessful.

In certain example embodiments wherein the user 101 transacts with the merchant system website 157, the user computing device 110 web browser 117 may be re-directed to the merchant website 157 after a transaction authorization request is approved or denied. For example, the merchant website 157 may display its own receipt on the merchant system website 157. For example, the receipt may comprise a summary of the user's 101 order and shipping information.

Other Example Embodiments

FIG. 11 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to provision tokenized card devices to user computing devices, comprising, by a user computing device:

receiving card information at the user computing device via a wireless communication channel between the user computing device and a card device, wherein the card device comprises a near field communication card device, and wherein the wireless communication channel comprises a near field communication channel;

transmitting, to an issuer computing system via a processing system, a request to provision the card device, the request comprising the card information and an identifier associated with the user computing device;

receiving, from the issuer computing system via the processing system, a data item, the issuer computing system generating the data item;

transmitting, to the card device via the channel between the user computing device and the card device, the received data item;

receiving, from the card device via the channel between the user computing device and the card device, a checksum, the card device generating the checksum using the received data item and a shared secret, the issuer computing system generating the shared secret at a time of manufacture of the card device, the shared secret being stored by the card device and the issuer computing system;

transmitting, to the issuer computing system via the processing system, the checksum, the card information, and the identifier, the issuer system verifying the checksum using the shared secret, generating a token in response to verifying the checksum, and associating the card information and the identifier with the token;

receiving, from the issuer computing system via the processing system, the token; and storing the token at the user computing device.

2. The method of claim 1, wherein the data item comprises an unpredictable number.

3. The method of claim 1, wherein the data item comprises a random number.

4. The method of claim 1, wherein the issuer system further verifies the checksum using the data item.

5. The method of claim 1, wherein the user computing device communicates with the processing system via an application resident on the user computing device, and wherein the processing system comprises an account associated with a user associated with the user computing device.

6. The method of claim 1, wherein the issuer computing system generates the shared secret for saving by an application resident on the card device, and wherein the application resident on the card device calculates the checksum.

7. The method of claim 1, further comprising, by the user computing device:
receiving at a time after saving the token and from a user associated with the card device and the user computing device, a request to conduct a transaction with a merchant computing system using the token;
transmitting, to the processing system, a notification of the request of the user to conduct a transaction using the token, wherein the processing system transmits an authorization request comprising the token and the identifier to the issuer computing system, wherein the processing system receives an approval of the authorization request from the issuer computing system, and wherein the processing system processes the transaction in response to receiving the approval.

8. A system to provision tokenized card devices to user computing devices, comprising:
a storage device; and
a processor communicatively coupled to the storage device, wherein the processor executes application code instructions that are stored in the storage device to cause the system to:

receive, at a user computing device via a wireless communication channel between the user computing device and from a card device, card information, wherein the card device comprises a near field communication card device, and wherein the wireless communication channel comprises a near field communication channel;

transmit, to an issuer computing system via a processing system, a request to provision the card device to the user computing device, the request comprising the card information and an identifier associated with a user computing device, the issuer computing system being an issuer of the card device;

receive, from the issuer computing system via the processing system, a data item, the issuer system generating the data item;

transmit, to the card device via the channel between the user computing device and the card device, the received data item;

receive, from the card device via the channel between the user computing device and the card device, a checksum, the card device generating the checksum using the received data item and a shared secret, the issuer computing system generating the shared secret at a time of manufacture of the card device, the shared secret being stored by the card device and the issuer computing system;

transmit, to the issuer computing system via the processing system, the checksum, the card information, and the identifier, the issuer system verifying the checksum using the shared secret, generating a token in response to verifying the checksum, and associating the card information and the identifier with the token;

receive, from the issuer computing system via the processing system, the token; and store the token on the storage device.

9. The system of claim 8, wherein the data item comprises an unpredictable number.

10. The system of claim 8, wherein the data item comprises a random number.

11. The system of claim 8, wherein the issuer system further verifies the checksum using the data item.

12. The system of claim 8, wherein the system communicates with the processing system via a digital wallet application resident on the system, and wherein the processing system comprises a digital wallet account associated with a user associated with the system.

13. The system of claim 8, wherein the issuer computing system generates the shared secret for saving by an application resident on the card device, and wherein the application resident on the card device calculates the checksum.

14. The system of claim 8, wherein the processor is further configured to execute application code instructions stored in the storage device to cause the system to:
receive, at a time after saving the token and from a user associated with the card device and the system, a request to conduct a transaction with a merchant computing system using the token;
transmit, to the processing system, a notification of the request of the user to conduct a transaction, wherein the processing system transmits an authorization request comprising the token and the identifier to the issuer system, wherein the processing system receives an approval of the authorization request from the issuer computing system, and wherein the processing system processes the transaction in response to receiving the approval.

15. A computer program product to provision tokenized card devices to user computing devices, comprising:
- a non-transitory computer-readable storage device having computer-executable program instructions embodied therein that when executed by a computer cause the computer to:
- receive, at a user computing device via a wireless communication channel between the user computing device and a card device, card information, wherein the card device comprises a near field communication card device, and wherein the wireless communication channel comprises a near field communication channel;
- transmit, to an issuer computing system via a processing system, a request to provision the card device, the request comprising the card information and an identifier associated with a user computing device, the issuer computing system being an issuer of the card device;
- receive a data item from the issuer computing system via the processing system, the issuer computing system generating the data item;
- transmit, to the card device via the channel between the user computing device and the card device, the received data item;
- receive, from the card device via the channel between the user computing device and the card device, a checksum, the card device generating the checksum using the received data item and a shared secret, the issuer computing system generating the shared secret a time of manufacture of the card device, the shared secret being stored by the card device and the issuer computing system;
- transmit, to the issuer computing system via the processing system, the checksum, the card information, and the identifier, the issuer system verifying the checksum using the shared secret, generating a token in response to verifying the checksum, and associating the card information and the identifier with the token;
- receive, from the issuer computing system via the processing system, the token; and
- store the token on the user computing device.

16. The computer program product of claim 15, wherein the data item comprises an unpredictable number.

17. The computer program product of claim 15, wherein the data item comprises a random number.

* * * * *